(12) United States Patent
Davis

(10) Patent No.: US 10,334,988 B2
(45) Date of Patent: Jul. 2, 2019

(54) FOOD PORTIONING SYSTEM

(71) Applicant: The Nutrition Group, Inc., Irwin, PA (US)

(72) Inventor: Patrick Doyle Davis, Acme, PA (US)

(73) Assignee: The Nutrition Group, Inc., Irwin, PA (US)

( * ) Notice: Subject to any disclaimer, the term of this patent is extended or adjusted under 35 U.S.C. 154(b) by 0 days.

(21) Appl. No.: 15/591,735

(22) Filed: May 10, 2017

(65) Prior Publication Data

US 2017/0325638 A1    Nov. 16, 2017

Related U.S. Application Data

(60) Provisional application No. 62/336,049, filed on May 13, 2016.

(51) Int. Cl.
| | |
|---|---|
| *A47J 43/28* | (2006.01) |
| *B65D 25/28* | (2006.01) |
| *A47J 45/10* | (2006.01) |
| *A47G 23/04* | (2006.01) |
| *A47G 23/06* | (2006.01) |

(52) U.S. Cl.
CPC ............ *A47J 43/288* (2013.01); *A47G 23/04* (2013.01); *A47G 23/0616* (2013.01); *A47G 23/0633* (2013.01); *A47G 23/0641* (2013.01); *A47J 45/10* (2013.01); *B65D 25/28* (2013.01)

(58) Field of Classification Search
CPC ....... G01F 19/002; A47J 43/281; A47J 45/10; A47J 36/2405; B65G 7/12
USPC .......... 294/16, 27.1, 31.1, 118; 99/426, 449; 220/743, 756, 759, 769, 324, 485, 647; 211/181.1, 126.1; 206/518, 557
See application file for complete search history.

(56) References Cited

U.S. PATENT DOCUMENTS

| | | | | |
|---|---|---|---|---|
| 1,779,060 | A | * 10/1930 | Choate | ...................... A45F 5/00 220/6 |
| 1,875,379 | A | 9/1932 | Holmes | |
| 1,918,486 | A | * 7/1933 | Onos | ...................... B65D 71/50 294/118 |
| 2,349,531 | A | * 5/1944 | Weir | ...................... B65G 7/12 294/164 |

(Continued)

FOREIGN PATENT DOCUMENTS

JP    S59112228    6/1984

OTHER PUBLICATIONS

International Search Report and Written Opinion, dated Jul. 8, 2017, for International PCT Application No. PCT/US2017/032087.

(Continued)

*Primary Examiner* — Chun Hoi Cheung
*Assistant Examiner* — Brijesh V. Patel
(74) *Attorney, Agent, or Firm* — Frost Brown Todd LLC

(57) ABSTRACT

A food portioning system to more accurately and/or quickly portion food served from a food container includes a support for a container and a bracket coupled with the support. The bracket includes a scrape bar positioned above the support to level food within a serving implement. The scrape bar can also be used as a handle to carry, insert, or remove the food container from a steam table. The scrape bar can be adjustable relative to the support to position the scrape bar at varying heights. Such food portioning systems can be used to support a food container within a food well or on a countertop.

8 Claims, 22 Drawing Sheets

(56) References Cited

U.S. PATENT DOCUMENTS

| | | | |
|---|---|---|---|
| 2,564,571 A | 8/1951 | Havens | |
| 2,732,096 A * | 1/1956 | Siciliano | B65D 25/32 217/125 |
| 2,775,476 A * | 12/1956 | Brown | H01M 2/1005 294/29 |
| 2,844,279 A * | 7/1958 | Kovach | B65D 71/0003 206/170 |
| 3,365,071 A | 1/1968 | Ottinger | |
| 3,575,455 A | 4/1971 | Bloch | |
| 3,827,742 A * | 8/1974 | Holden | B65G 7/12 294/16 |
| 4,109,952 A * | 8/1978 | Monzain | B65G 7/12 294/118 |
| 4,117,965 A | 10/1978 | Rienzo | |
| 4,147,286 A * | 4/1979 | Bates, III | B65D 7/26 294/169 |
| 4,235,331 A * | 11/1980 | Bates, III | A45C 5/045 206/170 |
| 4,527,823 A * | 7/1985 | Straus | B65G 7/12 294/118 |
| 4,606,569 A | 8/1986 | Dunn et al. | |
| 4,836,392 A * | 6/1989 | Constantino | A47L 15/505 211/133.5 |
| 5,462,327 A | 10/1995 | Quick | |
| 5,511,467 A | 4/1996 | Motley et al. | |
| 5,794,999 A * | 8/1998 | Corsaro | B65G 7/12 294/16 |
| 5,823,367 A | 10/1998 | Moran, Jr. | |
| 5,934,722 A | 8/1999 | Evans | |
| 6,234,068 B1 * | 5/2001 | Sherman | A47J 36/2477 126/33 |
| 6,404,838 B1 | 6/2002 | Hall | |
| 6,823,773 B2 * | 11/2004 | Swinford | A47J 37/0694 99/426 |
| 6,974,056 B2 | 12/2005 | Rea | |
| D655,471 S | 3/2012 | Schnatter | |
| 8,240,244 B2 | 8/2012 | McKinght et al. | |
| 8,656,829 B2 * | 2/2014 | Ciaciura | A47J 37/0694 99/395 |
| 8,763,823 B2 | 7/2014 | Eaves, Jr. et al. | |
| D712,107 S | 8/2014 | Schnatter | |
| 9,222,820 B2 | 12/2015 | Conners | |
| 9,301,631 B2 | 4/2016 | Siren | |
| 2005/0076795 A1 * | 4/2005 | Riddle | A47J 36/24 99/483 |
| 2007/0175892 A1 * | 8/2007 | Izumi | B65D 21/086 220/9.4 |
| 2009/0261113 A1 | 10/2009 | Miota | |
| 2010/0071567 A1 | 3/2010 | Tosdale et al. | |
| 2012/0055583 A1 | 3/2012 | Schnatter | |

OTHER PUBLICATIONS

Update International 12" Stainless Steel Adapter Bar; Retrieved on May 2, 2016 from: http://www.foodservicewarehouse.com/update-international/ab-12n/p536132.aspx.

* cited by examiner

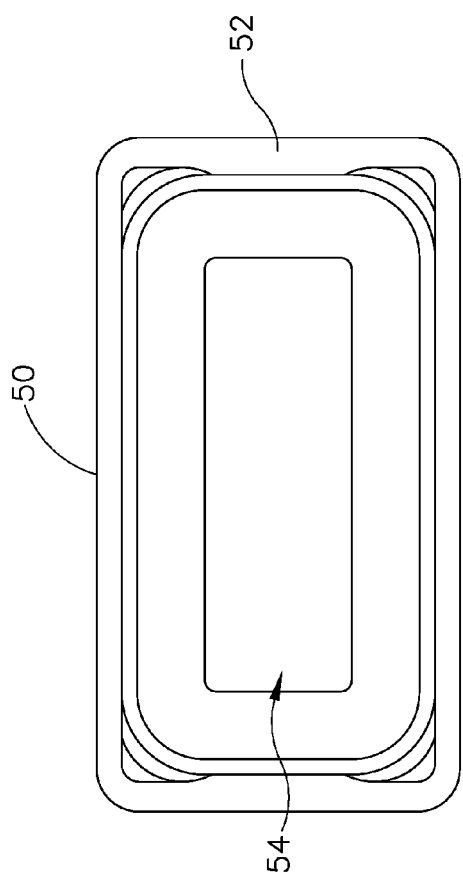
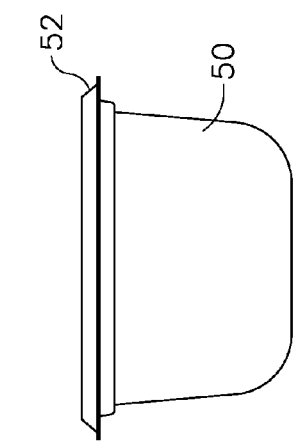
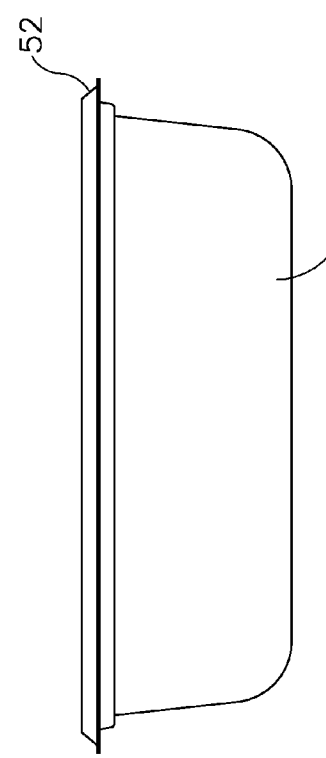

FOOD PORTIONING SYSTEM

PRIORITY

This application claims benefit to U.S. Provisional Patent Application Ser. No. 62/336,049, entitled "Food Portioning System," filed on May 13, 2016, the contents of which are incorporated by reference herein.

TECHNICAL FIELD

The present disclosure is directed to a food portioning system that may be used to more accurately portion food served from a food container.

BACKGROUND

Many facilities, such as schools, hospitals, cafeterias, restaurants, prisons, etc., serve food portions from larger food containers. To serve the food from such a food container, a serving implement, such as a spoon, spoodle, ladle, etc., can be used to scoop and portion the food from the food container. Using these serving implements can be difficult and time consuming to provide consistent and accurate food portions served from the food container. For instance, if the food is not scooped properly with the serving implement, the food portion can be too large or too small. Also, the time spent trying to obtain the proper amount of food with the serving implement may slowdown the service line with attempts to level the food portion with the serving implement, such as by shaking the serving implement. Inaccurate food portions can also be costly when too much food is served in a food portion. For instance, food portions are typically served between about a 3 and 5% margin in order to control costs. Thus, there remains a need for a food portioning system to level food portions to provide accurate food portioning and/or to increase the speed of the serving line.

In some instances, these serving lines position the food container within a steam table to keep the food warm during serving. It can be difficult to quickly insert and/or remove the food container from such a steam table. For instance, to remove a food container from a steam table, a user typically pries the food container away from the table, which can result in pinched fingers. Further, because of the hot temperature of the steam table, a user can burn his or her fingers on the food container and/or steam table while trying to remove the food container, making removal of the food container unsafe. Thus, there remains a need for a system to more easily and safely carry, insert, and/or remove a food container from a steam table.

SUMMARY

The unique solution that addresses the aforementioned need is a food portioning system as described herein.

A food portioning system is disclosed that may be used to more accurately and/or quickly portion food served from a food container, thereby saving time and costs. The food portioning system further allows a user to more easily and safely carry, insert, and/or remove a food container from a steam table. A food portioning system includes a support configured to hold a container and a bracket coupled with the support. The bracket includes a scrape bar positioned above the support that is configured to more easily level food within a serving implement. The scrape bar may also be used as a handle to carry, insert, and/or remove the food container from a steam table. The scrape bar may be adjustable relative to the support to position the scrape bar at varying heights. Such food portioning systems can be used to support a food container within a food well, or on a countertop.

These and other embodiments of the food portioning system are set forth in greater detail below.

BRIEF DESCRIPTION OF THE DRAWINGS

It is believed that the present invention will be better understood from the following description of certain examples taken in conjunction with the accompanying drawings, in which like reference numerals identify like elements.

FIG. 2 is a top plan view of the food container of FIG. 1.

FIG. 3 is a side elevational view of the food container of FIG. 1.

FIG. 4 is a front view of the food container of FIG. 1.

Figure 1:
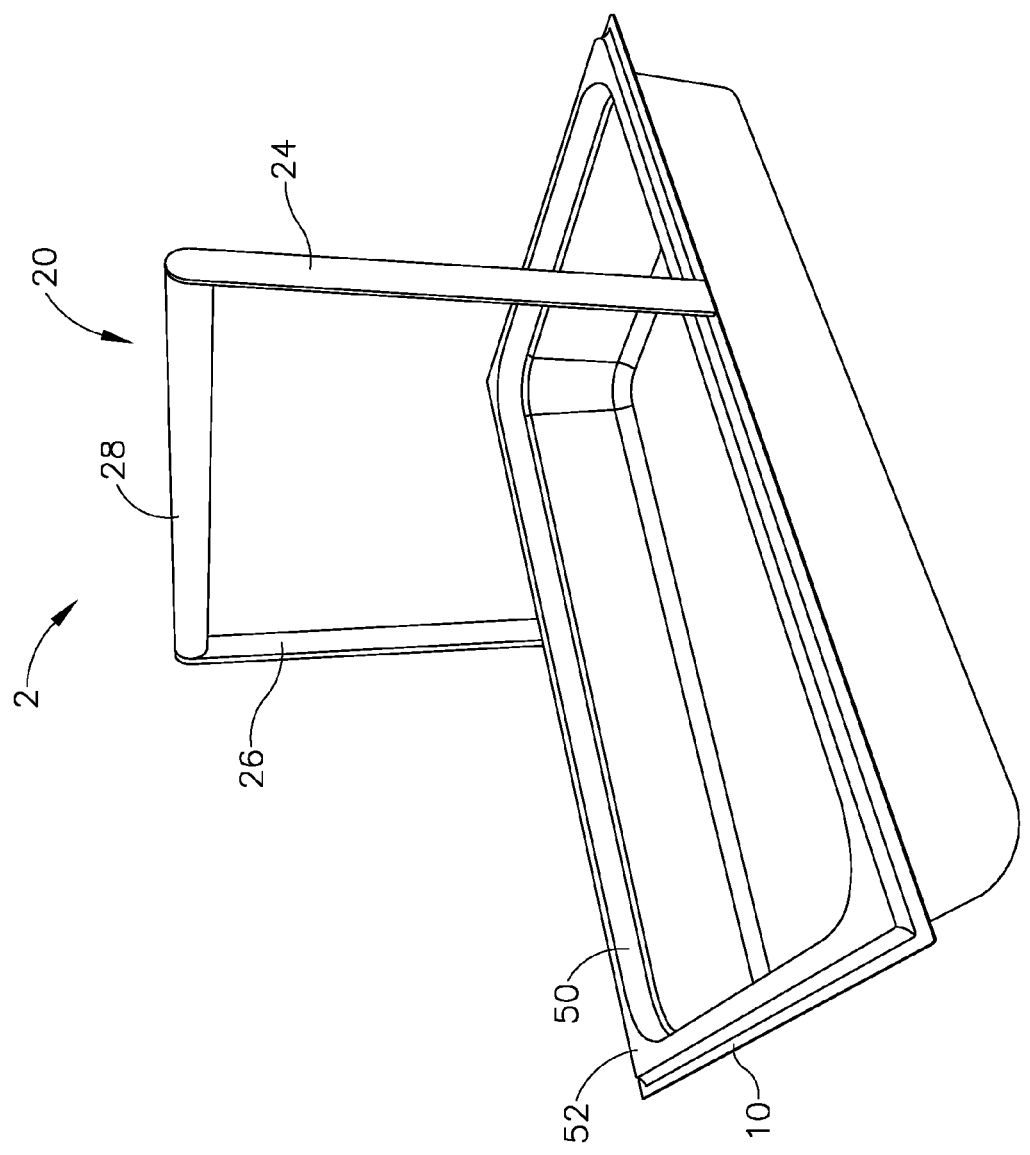
FIG. 1 is a top perspective view of a food portioning system holding a food container.
Figure 5:
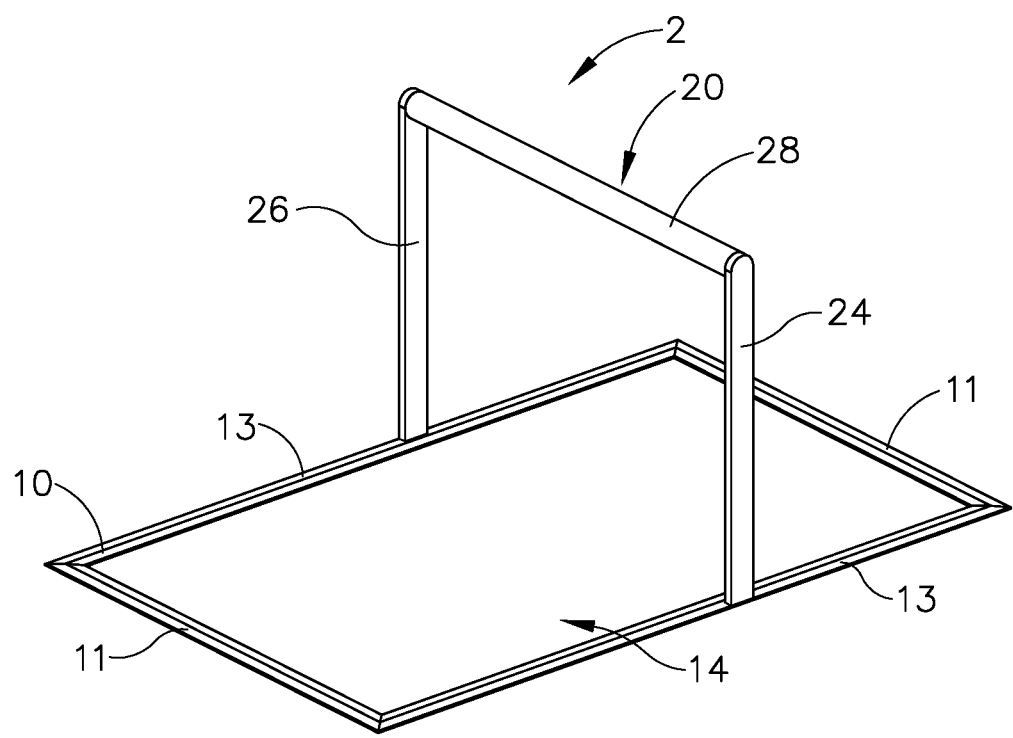
FIG. 5 is a top perspective view of the food portioning system of FIG. 1.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects of the present disclosure, and together with the descriptions serve to explain the principles and concepts of the present disclosure; it being understood, however, that the present disclosure is not limited to the precise arrangements shown.

DETAILED DESCRIPTION

The following description and embodiments of the present disclosure should not be used to limit the scope of the present disclosure. Other examples, features, aspects, embodiments, and advantages of the present disclosure will become apparent to those skilled in the art from the following description. As will be realized, the present disclosure may contemplate alternate embodiments than those exemplary embodiments specifically discussed herein without departing from the scope of the present disclosure. Accordingly, the drawings and descriptions should be regarded as illustrative in nature and not restrictive.

"Serving implement" as used herein, means a device for serving food. Non-limiting examples of serving implements may be selected from the group of: spoons; spoodles; ladles; cups; and combinations thereof.

"Food container" as used herein, means a device for holding food. Non-limiting examples of food containers may be selected from the group of: pans; bowls; dishes; cans; chafing dish; and combinations thereof.

"Food safe materials" as used herein, means any material that meets public health and safety standards, such as those provided by the Food and Drug Administration ("FDA") and/or the National Sanitation Foundation ("NSF"). Non-limiting examples of food safe materials may be selected from the group of: plastic; stainless steel; and combinations thereof.

"Fasteners" as used herein, means devices for coupling one component with another. Non-limiting examples of fasteners may be selected from the group of: pins; screws; nails; adhesives; welds; and combinations thereof.

For purposes of this disclosure, the terms "substantially" and "approximately" mean that something need not be exact, but is close enough to function in the same manner as if it were exact. Accordingly, a substantially horizontal scrape bar will be close enough to horizontal to allow it to level food within a serving implement and/or allow it to be grasped as a handle to carry the food portioning system.

A food portioning system is disclosed that may be used to more accurately and/or quickly portion food served from a food container, thereby saving time and costs. A food portioning system includes a support configured to hold a container and a bracket coupled with the support. The bracket includes a scrape bar positioned above the support that is configured to more easily level food within a serving implement. The scrape bar may be adjustable relative to the support to position the scrape bar at varying heights. Such food portioning systems can be used to support a food container within a food well, or on a countertop.

FIG. 1 shows an embodiment of a food portioning system (2). Food portioning system (2) comprises a support (10) and a bracket (20). In the illustrated embodiment, support (10) is formed to receive a food container (50), which will be described in more detail below.

Container (50) of the present embodiment, as best seen in FIGS. 2-4, comprises a rectangular pan having a flange (52) extending outwardly around the perimeter of a top portion of container (50). Container (50) further comprises a recess (54) that is used to store food extending inwardly within container (50). Recess (54) can have a width of about 11¾ inches and a length of about 19⅞ inches. Flange (52) can extend from recess (54) about 1 inch such that the container (50) can have an exterior width of about 12¾ inches and an exterior length of about 20⅞ inches.

Support (10) can thereby have corresponding dimensions to hold container (50). For instance, referring to FIGS. 5-9, support (10) of the present embodiment comprises a first pair of opposing rails (11) and a second pair of opposing rails (13). The first pair of opposing rails (11) are positioned substantially parallel with each other at a front and rear portion of support (10). The second pair of opposing rails (13) are positioned substantially parallel with each other at a first and second side portion of support (10) such that the second pair of rails (13) are substantially perpendicular with the first pair of rails (11). Rails (11, 13) may be integral with each other, or rails (11, 13) may be fastened together via fasteners. In the present embodiment, the first pair of rails (11) is shorter than the second pair of rails (13) to form a rectangular shape. This provides a support (10) having an opening (14) positioned between the first and second pair of rails (11, 13) this is also a rectangular shape. This may correspond to recess (54) of container (50). Accordingly, recess (14) may have a width of about 12 inches and a length of about 20 inches. Each rail of support (10) can comprise about a ¼ inch by about ¾ inch stainless steel bar stock such that support (10) may have an outer width of about 13½ inches and an outer length of about 21½ inches. The rails of support (10) are thereby positioned to extend outwardly from opening (14) under container (50) to engage flange (52) of container (50) to support the weight of container (50). This allows container (50) to be inserted or removably coupled with support (10) of food portioning system (2) without the need for additional fasteners. Because no additional fasteners are used, food portioning system (2) may more easily meet and/or exceed NSF food preparation standards.

By allowing container (50) to be inserted within support (10), container (50) can be inserted within an insulated food well in a countertop or a chafing dish. For instance, a countertop can have a cut out corresponding to the size of container (50) such that container (50) can be inserted within the cut out. The cut out can be insulated to maintain the food within container (50) at a hot or cold temperature. Support (10) can thereby be sized relative to the cut out and positioned on the countertop to align opening (14) with the cut out. Container (50) can then be inserted within opening (14) to position recess (54) of container (50) within both opening (14) of support (10) and the cut out of the countertop such that rails (11, 13) of support (10) engage flange (52) of container (50) to support container (50) within the cut out.

Of course, other suitable dimensions and/or shapes can be used for container (50) and/or support (110). For instance, support (10) can have any suitable number and/or size of rails to form any suitable shape for opening (14) (e.g., rectangular, square, circular, etc.) to support a flange (52) of any suitable shaped container (50). Support (10) can have a similar shape as container (50), as discussed above, or support (10) can have a different shape than container (50). In the present embodiment, support (10) is configured to extend underneath flange (52) such that the outer edges of the rails (11, 13) of support (10) extend just beyond the outer edges of flange (52). In some other embodiments, support (10) can extend shorter than and/or be aligned with the outer edges of flange (52). Support (10) can be made of any suitable food safe material.

Figure 9:
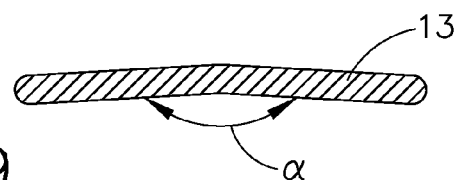
FIG. 9 is a cross-sectional view of a support of the food portioning system of FIG. 1 taken along line 9-9 in FIG. 8.

As best seen in FIG. 9, each rail (11, 13) comprises an angled cross-sectional profile. In the illustrated embodiment, each rail (11, 13) is angled downwardly at an angle (α). The angle (α) can be about 15°, or any other suitable angle. The angle (α) of rails (11, 13) allow support (10) to be positioned over a lip of a standard steam table (not shown). The downward angle of rails (11, 13) are configured to lock steam within the steam table to provide better thermal efficiency as well as to prevent burns to the food server scooping food from container (50). The angle of rails (11, 13) further prevents rocking of support (10), and thereby container (50), during use of the food portioning system (10). Of course, rails (11, 13) can have any other suitably shaped cross-sectional profile (e.g., rectangular, square, circular, etc.). In some embodiments, rails (11, 13) are hollow to save material and weight. Rails (11, 13) can be integral with each other, or rails (11, 13) can be fastened together via fasteners. Of course, other suitable embodiments for support (10) will be apparent to one with ordinary skill in the art in view of the teachings herein.

Figure 6:
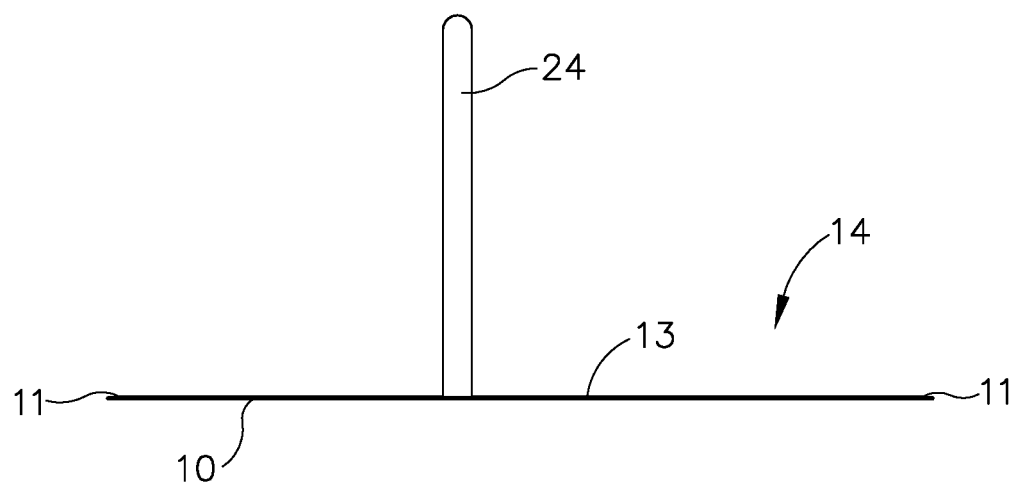
FIG. 6 is a side elevational view of the food portioning system of FIG. 1.
Figure 7:
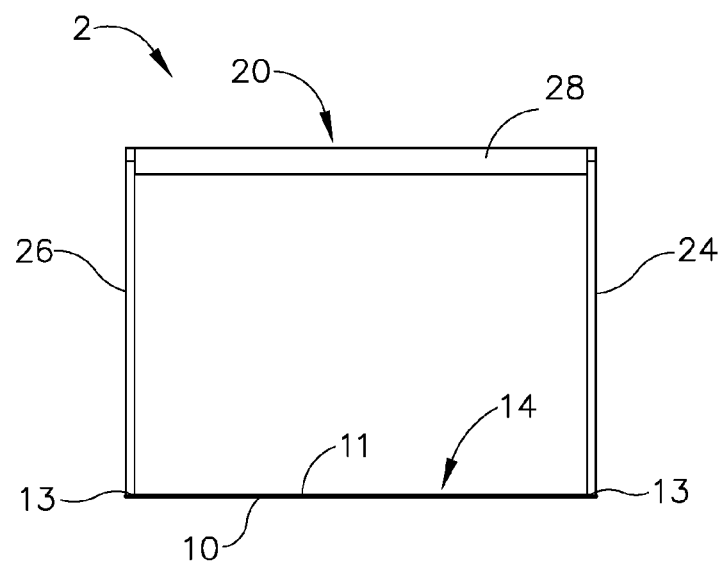
FIG. 7 is a front view of the food portioning system of FIG. 1.
Figure 8:
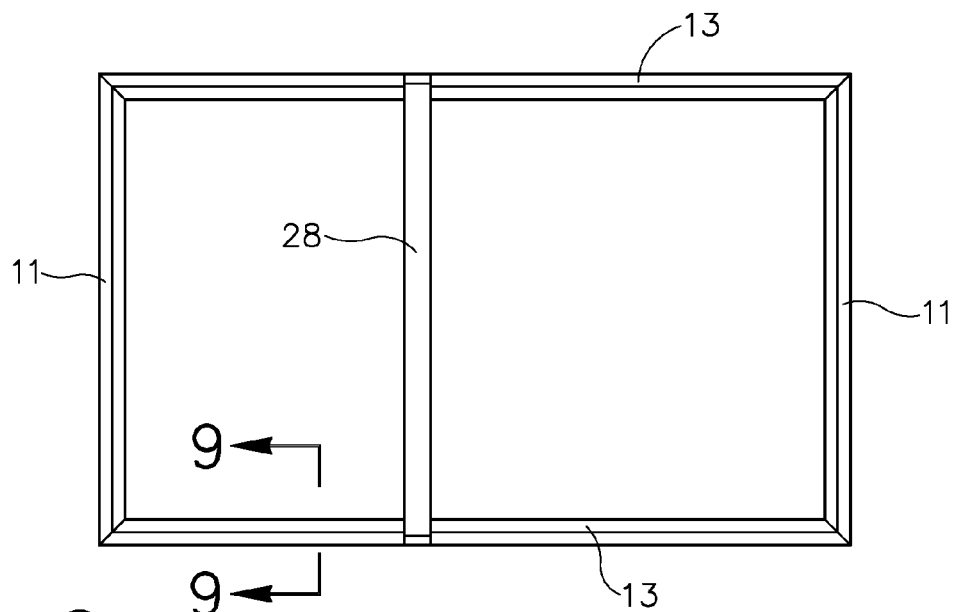
FIG. 8 is a top plan view of the food portioning system of FIG. 1.

Referring back to FIGS. 5-8, a bracket (20) is coupled with support (10) to support a scrape bar (28) above support (10). Bracket (20) comprises a pair of rods (24, 26) extending upwardly from support (10). Rods (24, 26) can extend upwardly perpendicular from support (10), as shown, or rods (24, 26) can extend upwardly from support (10) at any other suitable angle. In the illustrated embodiment, each rod (24, 26) further comprises a rectangular cross-sectional profile. For instance, each rod (24, 26) can comprise about a ¼ inch by about ¾ inch stainless steel bar stock. Of course, other suitable sizes and/or shapes can be used for rods (24, 26). For instance, rods (24, 26) can be hollowed stainless steel. As best seen in FIG. 6, rods (24, 26) are coupled to the second pair of rails (13) of support (10) such that rods (24, 26) are off-center relative to each rail (13) in the present embodiment. For instance, each rod (24, 26) is positioned rearwardly relative to support (10) such that each rod (24, 26) is about 8¾ inches from a back end of support (10). In other embodiments, rods (24, 26) may be positioned centrally along rails (13), or rods (24, 26) may be positioned forwardly along rails (13). Rods (24, 26) can also be coupled with the first pair of rails (11). In the present embodiment, rods (24, 26) are fixed to rails (13) such as by welding. Rods (24, 26) can be coupled to rails (13) using other suitable types of fasteners, and/or rods (24, 26) can be removably coupled to rails (13) to allow rods (24, 26) to be adjustable relative to support (10). Alternatively, rods (24, 26) can be integral with support (10). Of course, other suitable embodiments for rods (24, 26) will be apparent to one with ordinary skill in the art in view of the teachings herein.

Bracket (20) further includes a scrape bar (28) extending along the width of support (10) between rods (24, 26) to position scrape bar (28) above opening (54) of container (50). In other embodiments, scrape bar (28) may extend across only a portion of the width of support (10). Scrape bar (28) is substantially horizontal to allow a serving implement to be scraped along a bottom surface of the scrape bar (28). Scrape bar (28) can also be used as a handle to carry the food portioning system (2) and a container (50) positioned within the food portioning system (2). Scrape bar (28) can be positioned at any suitable height relative to support (10). In the illustrated embodiment, scrape bar (28) comprises a circular cross-sectional profile, but any other suitable shape can be used (e.g., square, rectangular, etc.). Scrape bar (28) can be made from stainless steel, or any other food safe material. Scrape bar (28) may be hollow to save material and weight. In the present embodiment, scrape bar (28) is fixed to rods (24, 26) such as by welding. Scrape bar (28) can also be coupled to rods (24, 26) using other suitable types of fasteners, and/or scrape bar (28) can be removably coupled to rods (24, 26) to allow scrape bar (28) to be adjustable relative to support (10). Alternatively, scrape bar (28) can be integral with rods (24, 26). Scrape bar (28) can thereby be used as a handle to lift and carry food portioning system (2) as well as a container (50). Of course, other suitable embodiments for scrape bar (28) will be apparent to one with ordinary skill in the art in view of the teachings herein.

When in use, container (50) can be filled with food and inserted into food portioning system (2). For instance, container (50) can be inserted within food portioning system (2) above support (10). Recess (54) of container (50) can then be lowered within support (10) until flange (52) of container (50) rests on a top surface of the rails (11, 13) of support (10) such that support (10) is configured to support the weight of container (50). Scrape bar (28) can be used to lift and carry both container (50) and food portioning system (2) to position container (50) within a food well. Food portioning system (2) thereby allows container (50) to be more easily and safely carried and positioned within a food well. For instance, container (50) can now be carried without the need to touch or hold container (50) directly, which may prevent burns to a user when container (50) is hot. Once positioned, a serving implement can be used to scoop food out of container (50). To more accurately and quickly portion the food within the serving implement, the top surface of the serving implement can be scraped along the bottom surface of scrape bar (28). This more easily and quickly removes excess food within the serving implement and allows the excess food to drop back into container (50). Optionally, the serving implement can be knocked on a top surface of scrape bar (28) to remove any excess food caught on an outer surface of the serving implement. The food portion within the serving implement can then be served. After the food has been served from the container (50), food portioning system (2) can then be used to remove the container (50) from the food well. For instance, a user can grasp the scrape bar (28) to lift and carry the food portioning system (2) and the container (50) positioned within the food portioning system (2). This makes removal and carrying of the container (50) easier and more safe by eliminating the need for a user to use fingers to pry the container (50) away from the hot food well.

Figure 10:
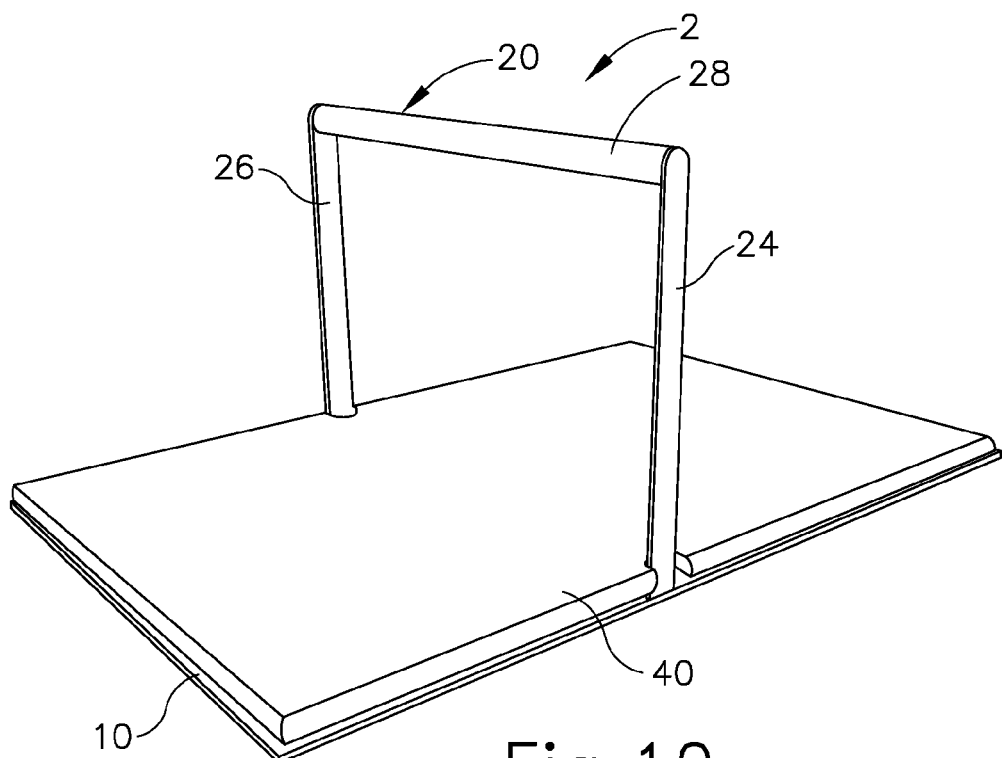
FIG. 10 is a top perspective view of the food portioning system of FIG. 1 with a board insert.
Figure 11:
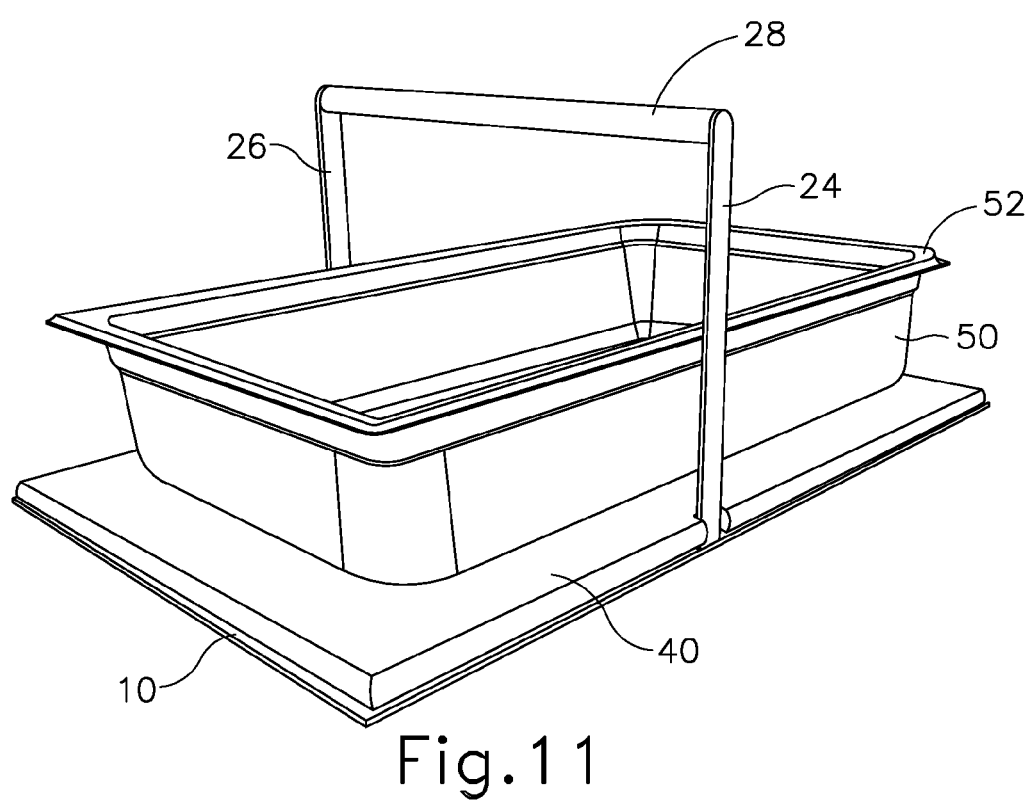
FIG. 11 is a top perspective view of the food portioning system of FIG. 10 holding a food container.
Figure 12:
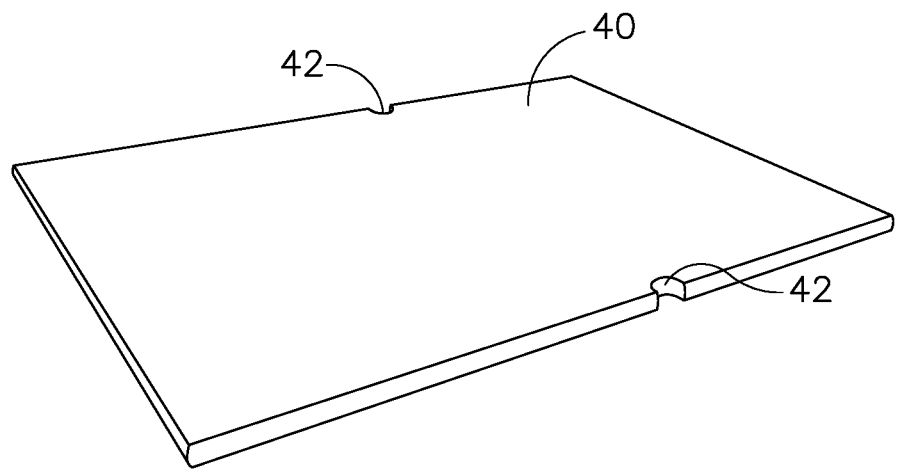
FIG. 12 is a top perspective view of the board insert of FIG. 10.
Figure 13:
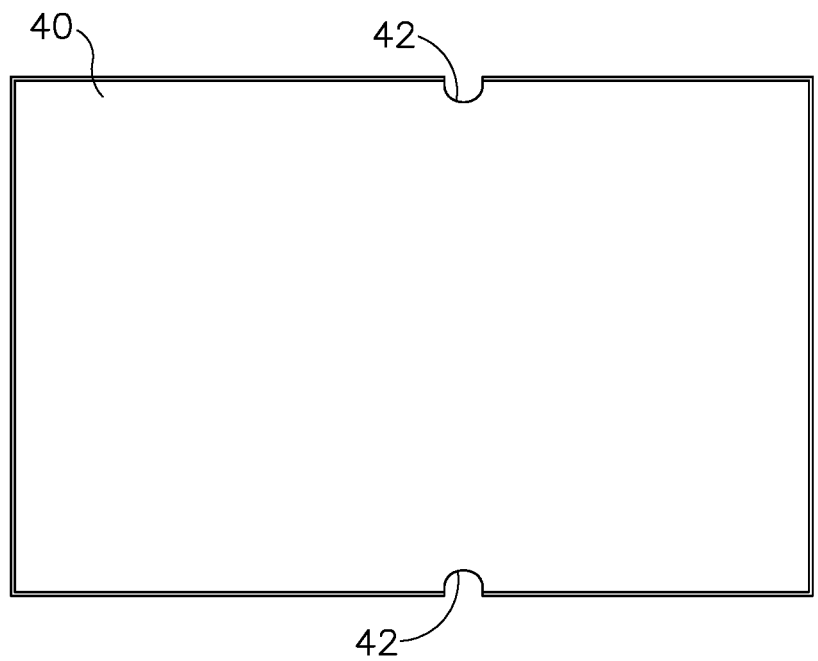
FIG. 13 is a top plan view of the board insert of FIG. 10.
Figure 14:
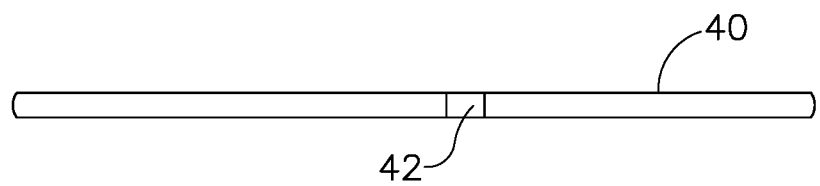
FIG. 14 is a side elevational view of the board insert of FIG. 10.
Figure 15:
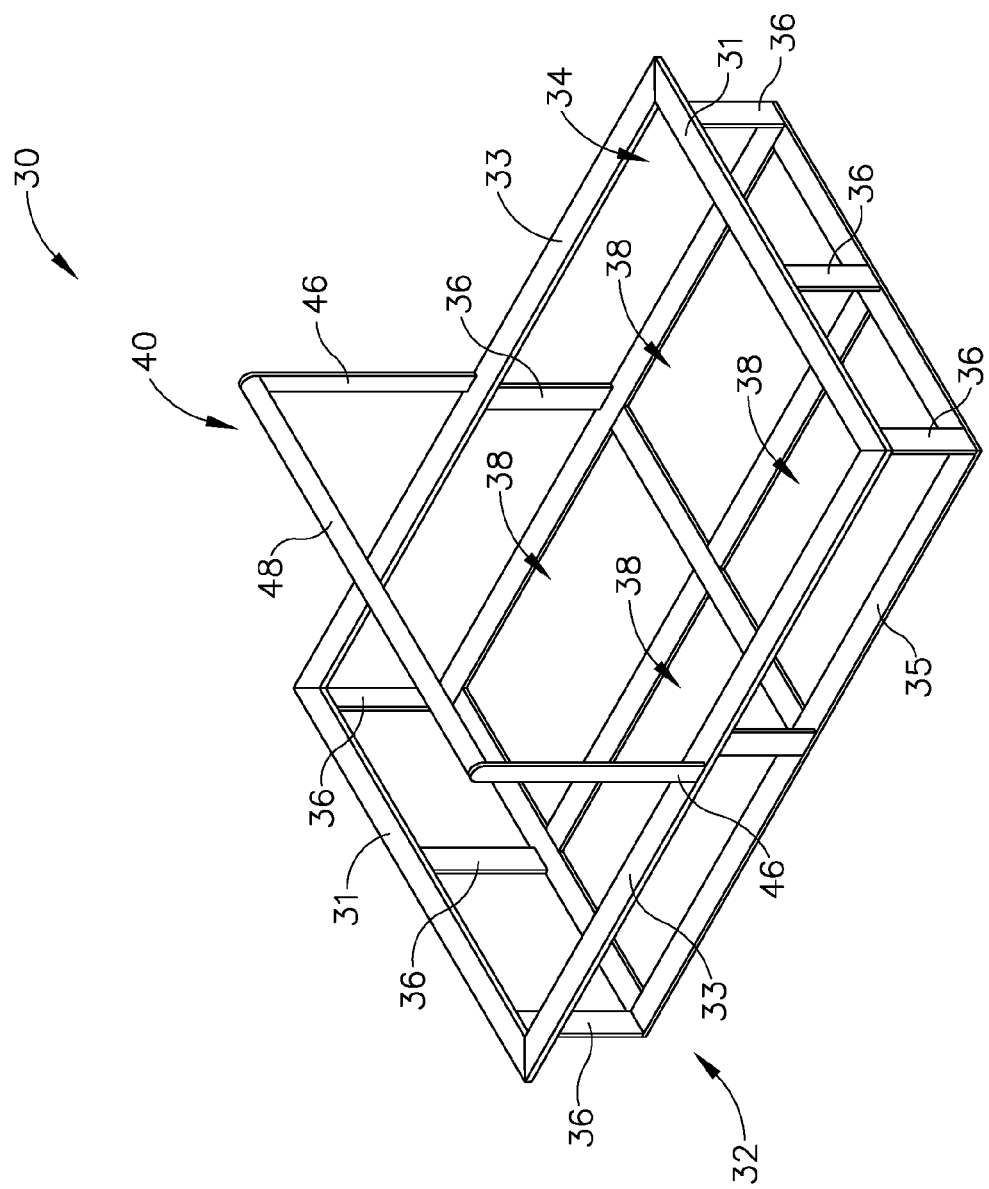
FIG. 15 is a top perspective view of another food portioning system.
Figure 16:
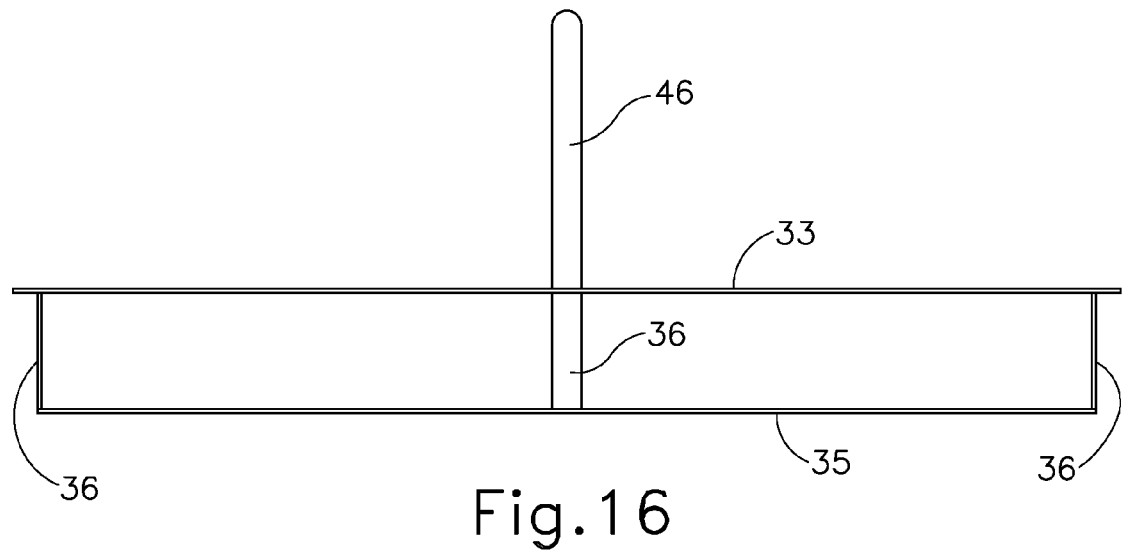
FIG. 16 is a side elevational view of the food portioning system of FIG. 15.
Figure 17:
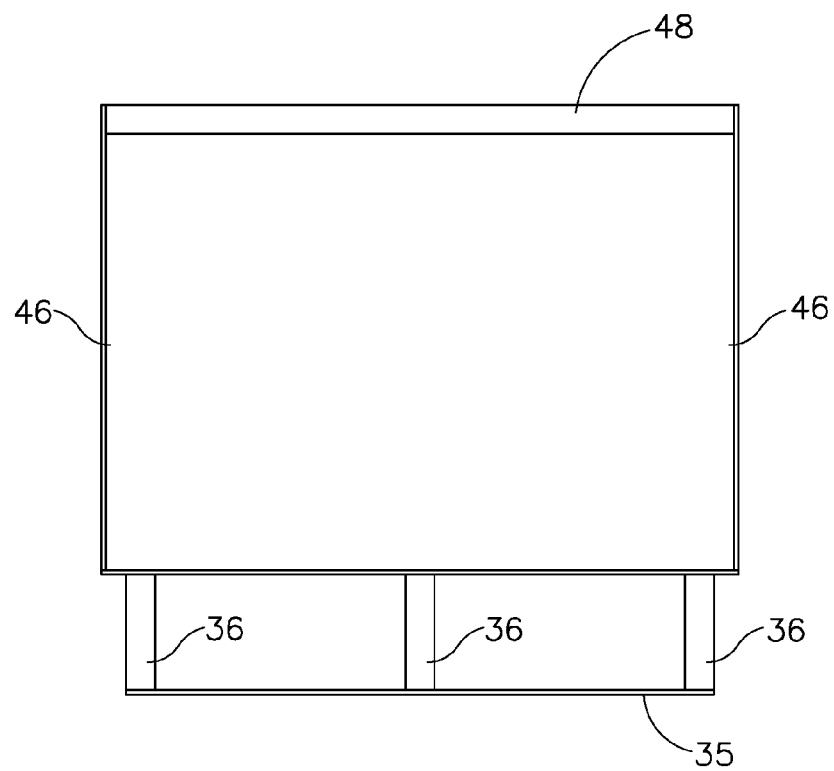
FIG. 17 is a front view of the food portioning system of FIG. 15.

In some instances, it may be further desirable to serve food from container (50) on a countertop or tabletop, instead of out of a food well or chafing dish. For this, a board insert (40) can be inserted within food portioning system (2) to hold container (50) above support (10), as shown in FIGS. 10-11. As best seen in FIGS. 12-14, board insert (40) comprises a board having a rectangular shape with a substantially flat top surface to receive a bottom surface of container (50). In the present embodiment, board insert (40) is selectively inserted within food portioning system (2) such that a bottom surface of board insert (40) rests on a top surface of support (10). As shown, board insert (40) extends along the width and length of support (10). In other embodiments, board insert (40) extends along only a portion of the width and/or length of support (10). Board insert (40) further comprises a pair of cutouts (42) that correspond to rods (24, 26) of bracket (20). For instance, cutouts (42) of the present embodiment have a semi-circular shape that allow rods (24, 26) to be received within cutouts (42), as best seen in FIG. 13. Cutouts (42) may thereby prevent insert (40) from slipping relative to support (10) during use. Cutouts (42) can have any other suitable shape (e.g., square, rectangular, etc.). Board insert (40) can be made of plastic or any other food safe material.

Of course, other suitable configurations can be used for board insert (40). For instance, board insert (40) can be fixed to support (10) and/or rods (24, 26) of bracket (20). Board insert (40) can also be removably coupled with support (10) and/or rods (24, 26) via friction fit or any other suitable type of fastener. Board insert (40) can be sized to have a larger length and/or width than support (10) such that board insert (40) is configured to extend beyond support (10). Still other suitable configurations for board insert (40) will be apparent to one with ordinary skill in the art in view of the teachings herein.

With the board insert (40), food portioning system (2) can be used similarly as described above. For instance, container (50) can be filled with food and inserted into food portioning system (2) such that a bottom surface of container (50) rests on a top surface of board insert (40), as shown in FIG. 11. Scrape bar (28) can also be used to lift and carry both container (50) and food portioning system (2) if desired. Once positioned, a serving implement can be used to scoop food out of container (50). To more accurately and quickly portion the food within the serving implement, the top surface of the serving implement can be scraped along the bottom surface of scrape bar (28). This removes excess food within the serving implement and allows the excess food to drop back into container (50). Optionally, the serving implement can be knocked on a top surface of scrape bar (28) to remove any excess food caught on an outer surface of the serving implement. The food portion within the serving implement can then be served. In some instances, board insert (40) can also be used as a cutting board.

Figure 18:
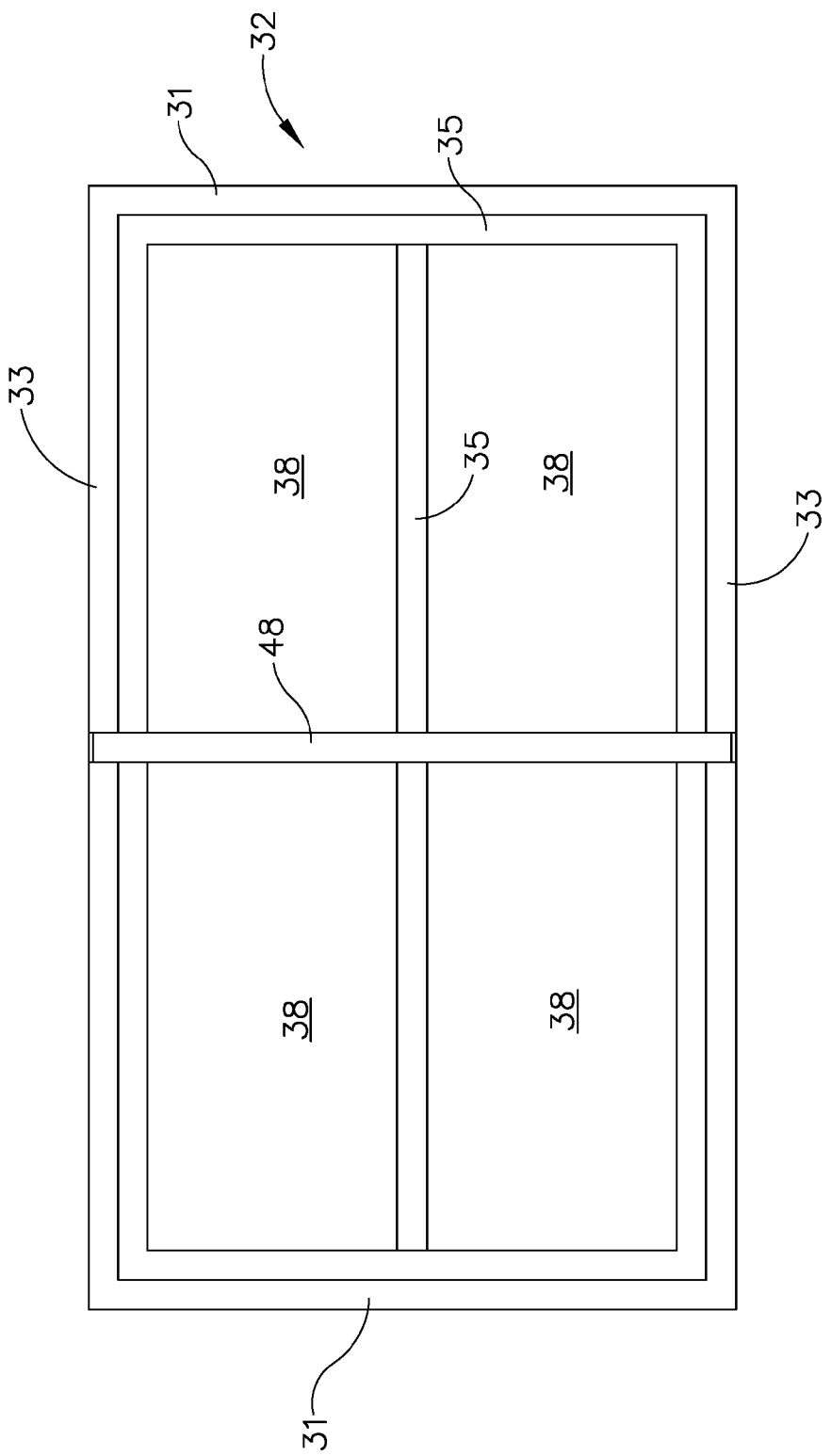
FIG. 18 is a top plan view of the food portioning system of FIG. 15.

FIGS. 15-18 show another embodiment of a food portioning system (30). Food portioning system (30) is similar to food portioning system (2), except that food portioning system (30) further comprises a pan holder (35). In the illustrated embodiment, pan holder (35) is centrally aligned underneath support (32) and is attached to support (32) via rods (36). As best seen in FIG. 18, holder (35) has a shorter width and length than support (32) such that the outer edges of holder (35) are vertically aligned with the inner edges of support (32). In some other versions, holder (35) has the same or larger width and/or length than support (32). Pan holder (35) is configured to support the bottom surface of a container (50) inserted within the food portioning system (30). Accordingly, food portioning system (30) is capable to support flexible containers. Pan holder (35) can be positioned between about 2 inches and about 4 inches below support (32), but other suitable dimensions can be used. In the illustrated embodiment, holder (35) has a plurality of openings (38) within holder (35) such that holder (35) comprises a first rod extending centrally along the length of the holder (35) and a second rod extending centrally along the width of the holder (35). These openings (38) may provide weight and/or cost savings for holder (35). Any suitable number of openings (38) can be used having any suitable shape. Still other suitable configurations for holder (35) will be apparent to one with ordinary skill in the art in view of the teachings herein.

Figure 19:
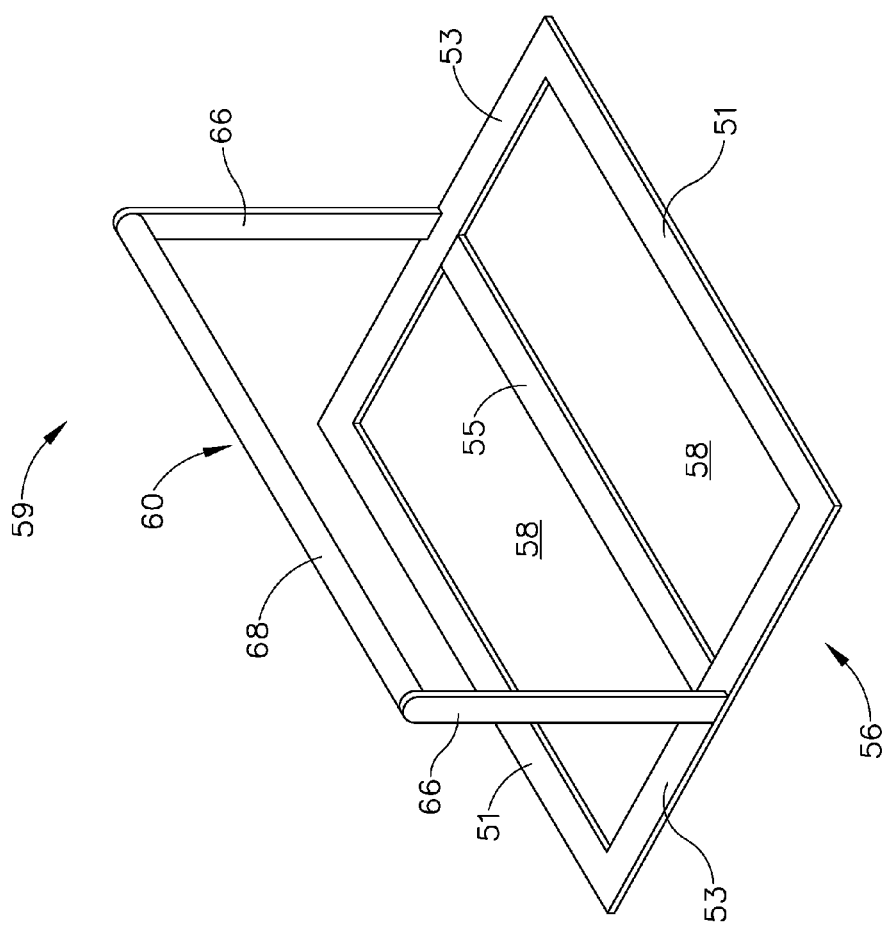
FIG. 19 is a top perspective view of another food portioning system.
Figure 20:
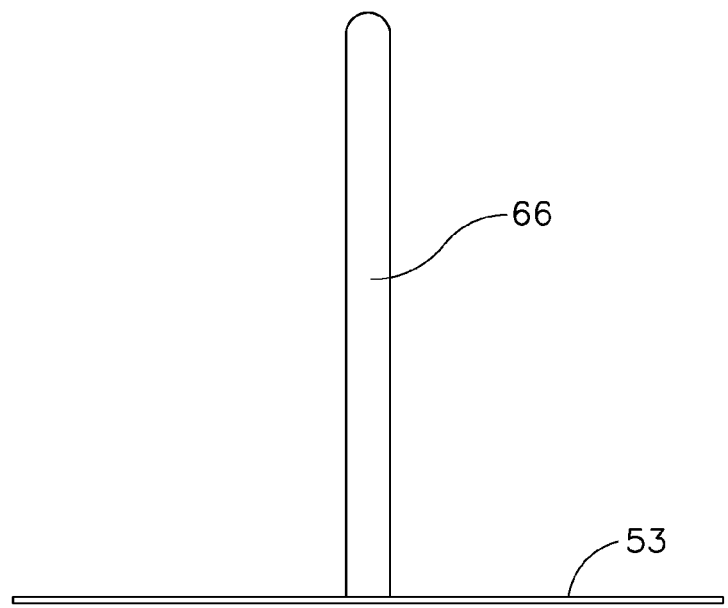
FIG. 20 is a side elevational view of the food portioning system of FIG. 19.
Figure 21:
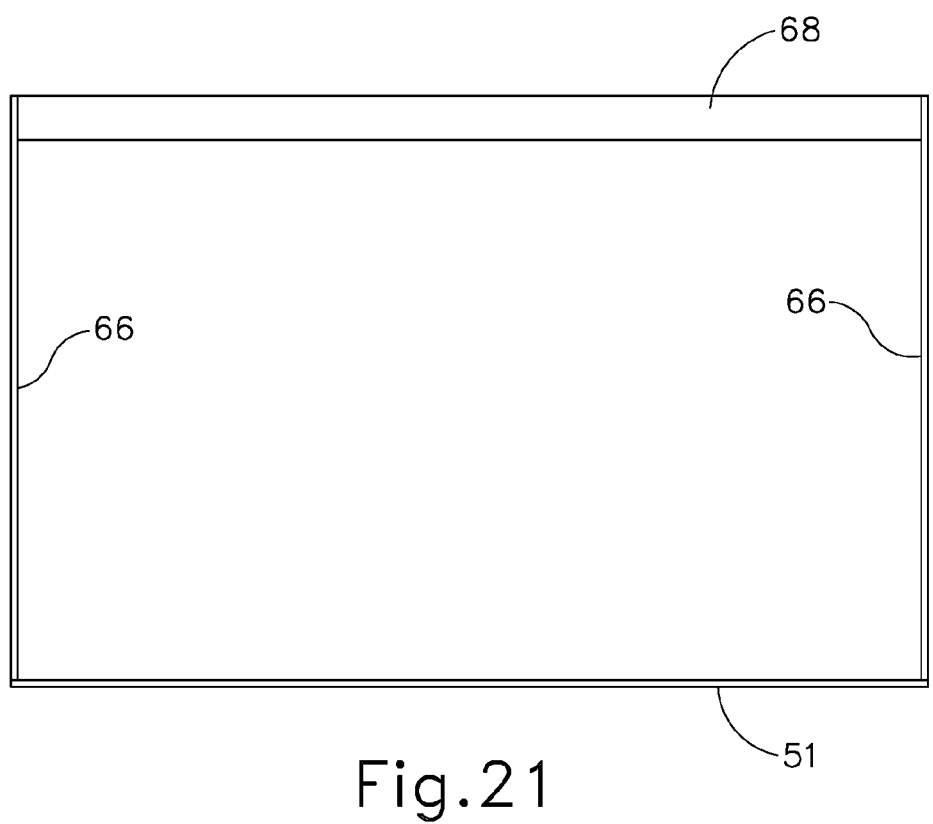
FIG. 21 is a front view of the food portioning system of FIG. 19.
Figure 22:
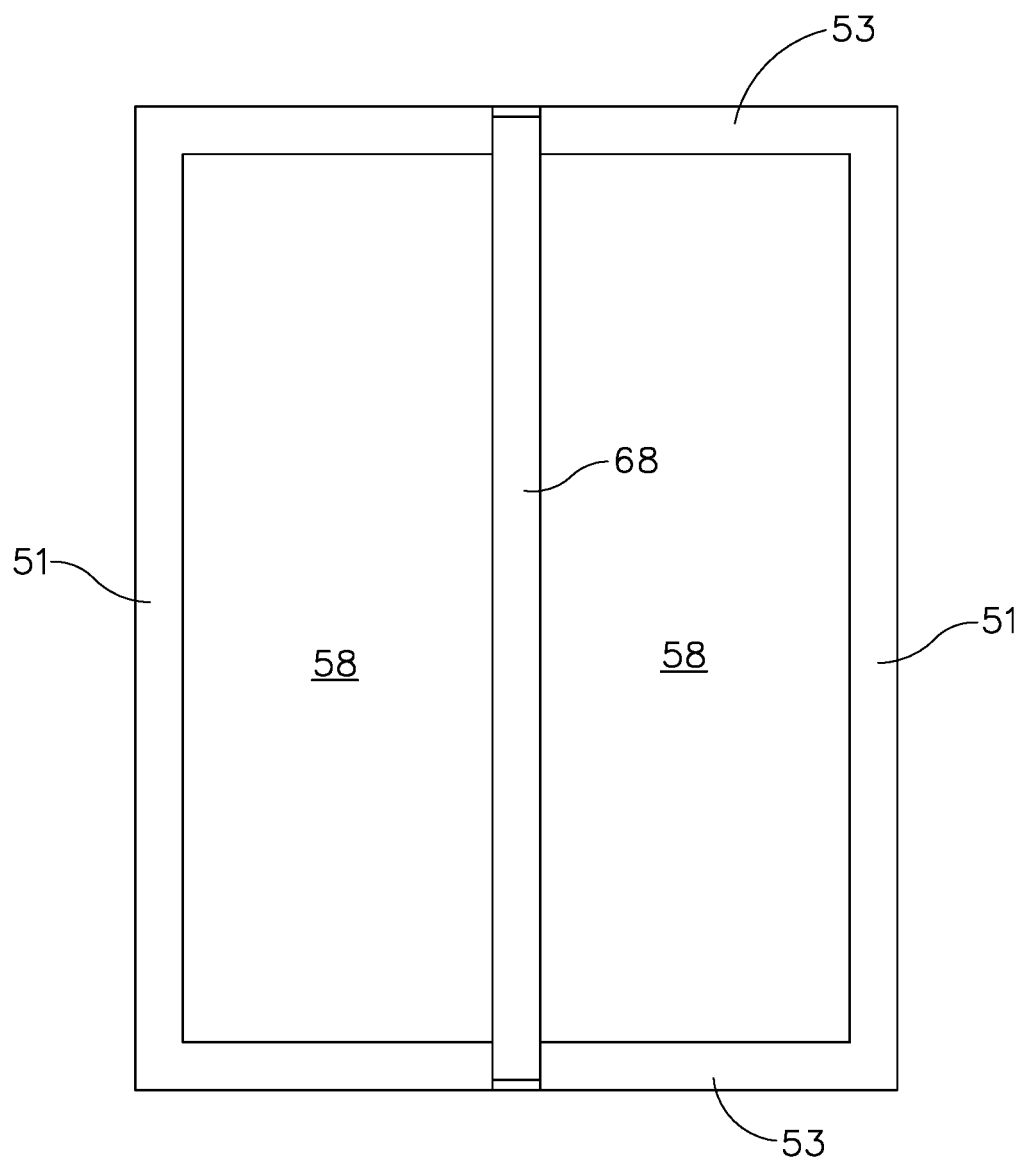
FIG. 22 is a top plan view of the food portioning system of FIG. 19.

FIGS. 19-22 show another embodiment of a food portioning system (59) that is similar to food portioning system (2), except that support (56) of food portioning system (59) further comprises a central bar (55). In the illustrated embodiment, central bar (55) extends centrally along the width of support (56) between rods (66) and underneath scrap bar (68) of bracket (60). Central bar (55) is aligned vertically with support (56). Central bar (55) is configured to support a bottom surface of a container (50). Of course, other suitable configurations for central bar (55) will be apparent to one with ordinary skill of the art in view of the teachings herein. For instance, bar (55) can be oriented to extend along the length of support (56) and/or bar (55) can be offset within support (56). As best seen in FIG. 19, bar (55) defines two openings (58) within support (56). These openings (58) may provide weight and/or cost savings for support (52). Any suitable dimensions for bar (55) can be used to provide any suitable number of openings (58) having any suitable shape. In some instances, bar (55) is formed with support (56) such that support (56) is solid with no openings (58). In some instances, bar (55) may be configured to allow support (56) to hold multiple containers. For instance, a container (50) can be inserted within each opening (58) of support (56) such that the rim of each container (50) is positioned on the top surface of support (56) and bar (55). It should be noted that the width of support (56) is larger than the length of the support (56) in the illustrated embodiment, but any other suitable configurations can be used.

Figure 23:
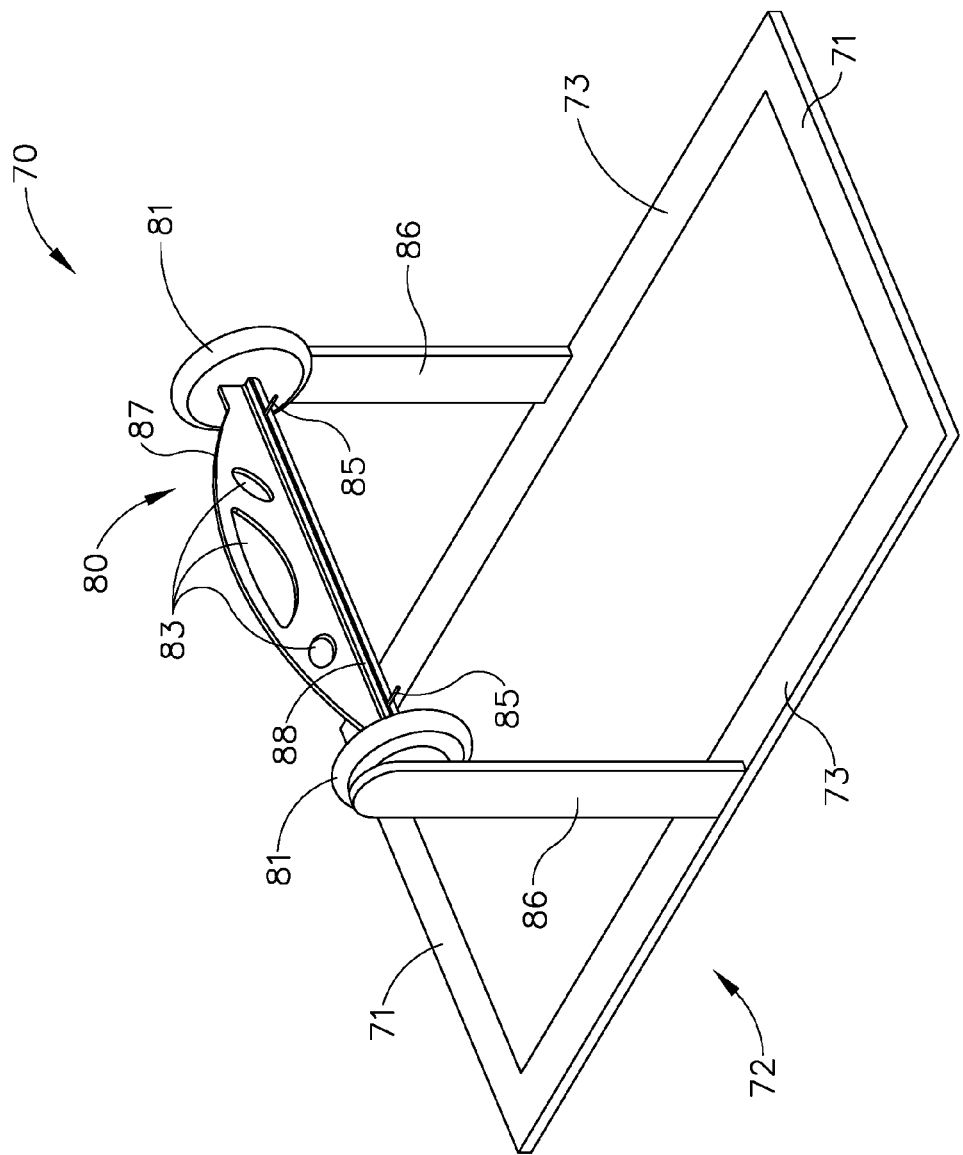
FIG. 23 is a top perspective view of another food portioning system.
Figure 24:
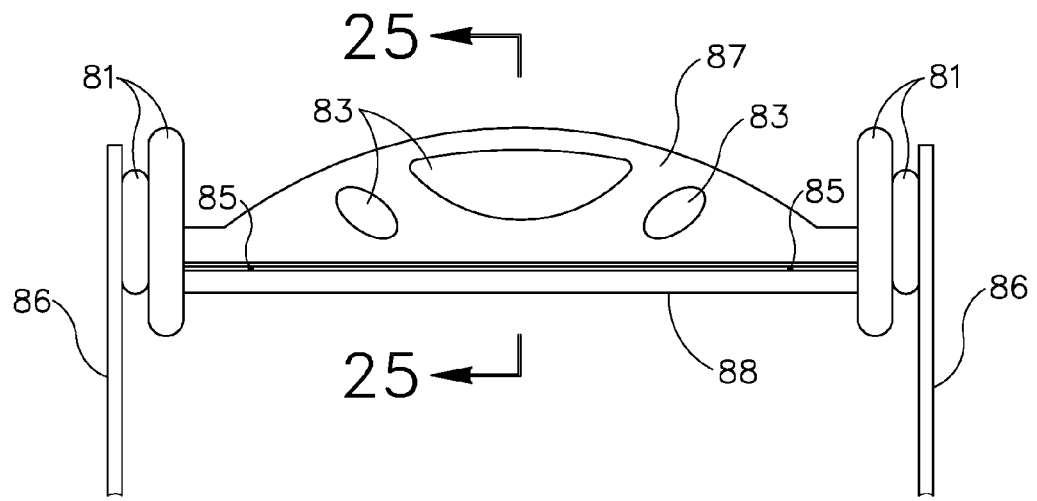
FIG. 24 is a front view of a bracket of the food portioning system of FIG. 23.
Figure 25:
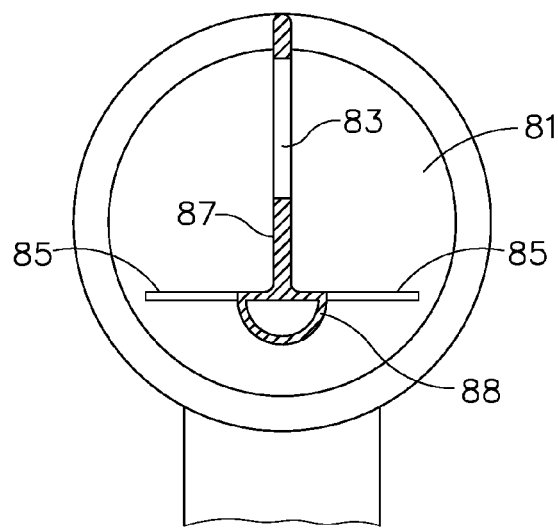
FIG. 25 is a cross-sectional view of the bracket of FIG. 24 taken along line 25-25 of FIG. 24.

FIGS. 23-25 show another embodiment of a food portioning system (70) that is similar to food portioning system (2), except that bracket (80) of food portioning system (70) further comprises a decorative bar (87). In the illustrated embodiment, decorative bar (87) extends along the top surface of scrape bar (88) of bracket (80). Decorative bar (87) is shaped as a semi-circle and comprises a plurality of elongated openings (83) positioned in a decorative pattern. Decorative bar (87) provides aesthetic appeal to bracket (80). Of course, other suitable configurations for decorative bar (87) will be apparent to one with ordinary skill in the art in view of the teachings herein. For instance, any other suitable shape (e.g., square, rectangular, triangular, etc.) can be used for decorative bar (87) and/or openings (83). Any suitable number of openings (83) can be used, but it should be noted that openings (83) are merely optional. Alternatively, or additionally, any suitable technique can be used to create any suitable decorative pattern on decorative bar (87). For instance, a decorative pattern can be printed, sanded, welded, sketched, etc., onto decorative bar (87), and/or the decorative pattern can include shapes, images, text, etc. For instance, decorative bar (87) can be used as a billboard to display a brand name and/or the type of food being served. Openings (83) may also be used as a utensil holder. As best seen in FIG. 24, a pair of buttons (81) are positioned at each end of decorative bar (87). Such buttons (81) can provide aesthetic appeal in addition to decorative bar (87). In the illustrated embodiment, buttons (81) have a circular profile, but any other suitable shape and/or number of buttons (81) can be used.

Bracket (80) further comprises a plurality of utensil holders (85) positioned along scrape bar (88). In the illustrated embodiment, each utensil holder (85) comprises a cylindrical shaped and extends outward from scrape bar (88). For instance, a utensil holder (85) protrudes from each side of scrape bar (88) at each end portion of scrape bar (88) such that four utensil holders (85) are shown. Each utensil holder (85) is configured to hold a serving implement to prevent the serving implement from slipping into a container (50) of food. Accordingly, when a serving implement is not being used, a serving portion of the serving implement can be placed in a container (50) and the handle of the serving implement can rest against a utensil holder (85). Other suitable configurations for utensil holders (85) will be apparent to one with ordinary skill in the art in view of the teachings herein. For instance, any suitable number and/or shape of utensil holders (85) can be placed along any portion of scrape bar (88) and/or bracket (80).

Figure 26:
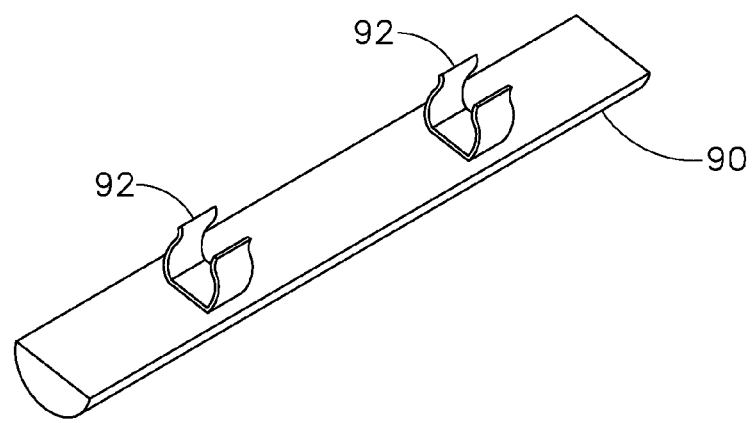
FIG. 26 is a top perspective view of a removable scrape bar for use with the bracket of FIG. 24.

FIG. 26 shows supplementary scrape bar (90) that can be selectively coupled with any of the brackets (20, 44, 60, 80) described herein. In the illustrated embodiment, the scrape bar (90) comprises a semi-circular profile such that the top surface of the scrape bar (90) is substantially flat. The scrape bar (90) further comprises at least one spring clip (92) for selectively coupling the scrape bar (90) to the scrape bar (28, 48, 68, 88) of a bracket (20, 44, 60, 80). Accordingly, scrape bar (90) can be removed from a bracket (20, 44, 60, 80) during transport of a food portioning system such that the scrape bar (28, 48, 68, 88) can be used as a handle to carry the food portioning system. The supplementary scrape bar (90) can then be coupled with the scrape bar (28, 48, 68, 88) by positioning the top surface of the supplementary scrape bar (90) underneath of the scrape bar (28, 48, 68, 88) and pushing upward such that each spring clip (92) flexes outward to receive the scrape bar (28, 48, 68, 88) and hold the supplementary scrape bar (90) to the scrape bar (28, 48, 68, 88). During use, the user can then portion the food using a bottom surface of the supplementary scrape bar (90), instead of a portion of the bracket (20, 44, 60, 80) that was handled to transport the food portioning system.

Still other suitable configurations for supplementary scrape bar (90) can be used. For instance, supplementary scrape bar (90) can be any suitable shape and can extend along either a portion or the entire length of the scrape bar (28, 48, 68, 88). Any other suitable method for selectively coupling the supplementary scrape bar (90) with the bracket (20, 44, 60, 80) can be used. Supplementary scrape bar (90) can be made of stainless steel or any other suitable material.

Figure 27:
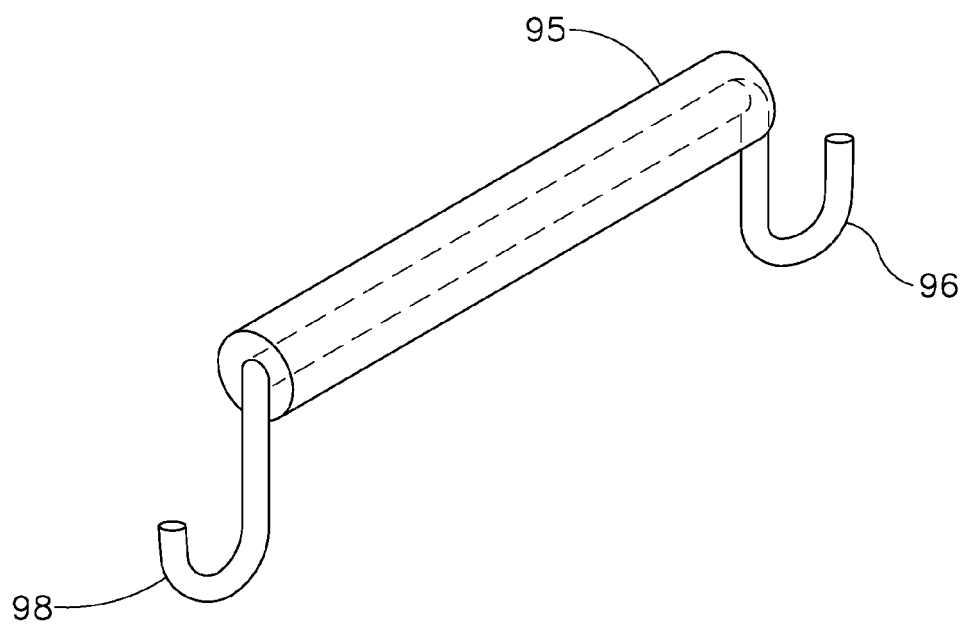
FIG. 27 is a top perspective view of a removable handle for use with the bracket of FIG. 24.

FIG. 27 shows a supplementary handle (95) that can be selectively coupled with any of the brackets (20, 44, 60, 80) described herein. In the illustrated embodiment, the handle (95) comprises a circular profile and a hook (96, 98) positioned at each end of the handle (95). The hooks (96, 98) extend outward from the handle (95) in opposing directions such that hook (96) extends forward from handle (95) and hook (98) extends rearward from handle (95). Each hook (96, 98) is configured to receive a portion of a scrape bar (28, 48, 68, 88) of a bracket (20, 44, 60, 80). Accordingly, handle (95) can be coupled to a bracket (20, 44, 60, 80) during transport of a food portioning system by positioned hooks (96, 98) underneath the scrape bar (28, 48, 68, 88) to use the handle (95) to carry the food portioning system. The opposing directions of the hooks (96, 98) minimize and/or prevent swinging of the food portioning system during transport. The handle (95) can then be detached from the scrape bar (28, 48, 68, 88) by lowering the handle (95) to release the scrape bar (28, 48, 68, 88). During use, the user can then portion the food using a bottom surface of the scrape bar (28, 48, 68, 88) that was not handled to transport the food portioning system.

Still other suitable configurations for handle (95) can be used. For instance, handle (95) can be any suitable shape and can extend along either a portion or the entire length of the scrape bar (28, 48, 68, 88). Any other suitable method for selectively coupling the handle (95) with the bracket (20, 44, 60, 80) can be used. Supplementary scrape bar (90) can be made of stainless steel or any other suitable material.

FIGS. 28-35 show another embodiment of a food portioning system (100). Food portioning system (100) is similar to food portioning system (2), except that food portioning system (100) comprises an adjustable scrape bar (28).

Figure 28:
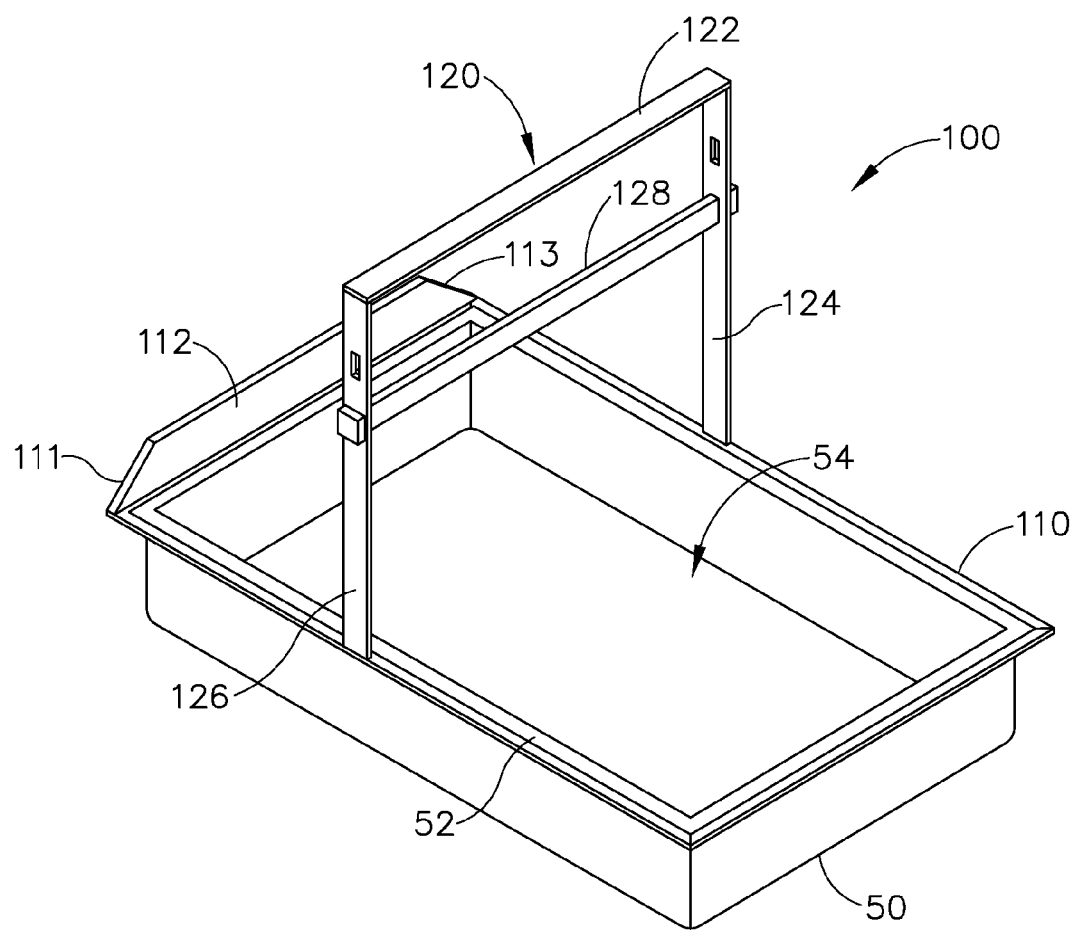
FIG. 28 is a top perspective view of another food portioning system holding a food container.
Figure 29:
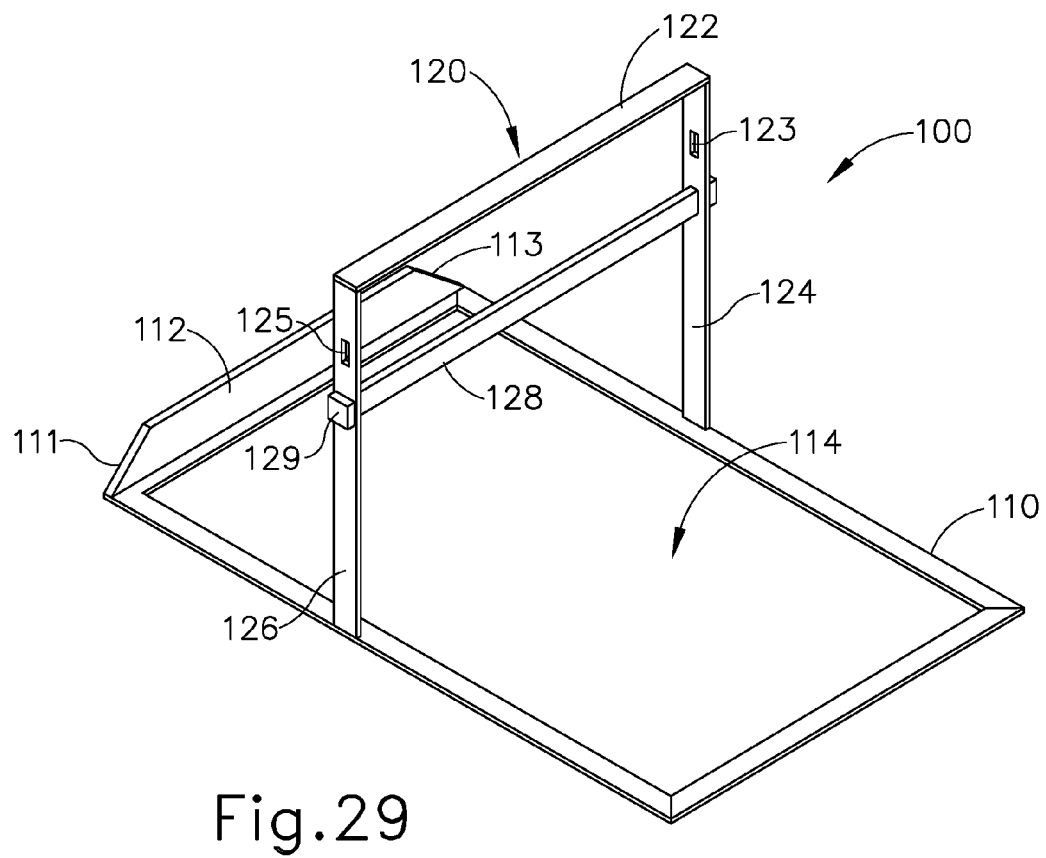
FIG. 29 is a top perspective view of the food portioning system of FIG. 28.

As best seen in FIG. 29, food portioning system (100) comprises a support (110), a bracket (120), and a scrape bar (128). In the illustrated embodiment, support (110) comprises four rails having rectangular profiles that form a rectangular shape. Support (110) is thereby formed to support a food container (50), as shown in FIG. 28.

Of course, other suitable dimensions and shapes can be used for container (50) and support (110). For instance, support (110) can have any suitable number of rails to form any suitable shape for opening (114) (e.g., rectangular, square, circular, etc.) to support a flange (52) of any suitable shaped container (50). Support (110) can have a similar shape as container (50), as discussed above, or support (110) can have a different shape than container (50). The rails can further have any suitable shaped cross-sectional profile (e.g., rectangular, square, circular, etc.). In the present embodiment, support (110) is configured to extend underneath flange (52) such that the outer edges of the rails of support (110) are substantially aligned with the outer edges of flange (52). In some other embodiments, support (110) can extend farther and/or shorter than the outer edges of flange (52). Support (110) can be made of any suitable food safe material.

Figure 30:
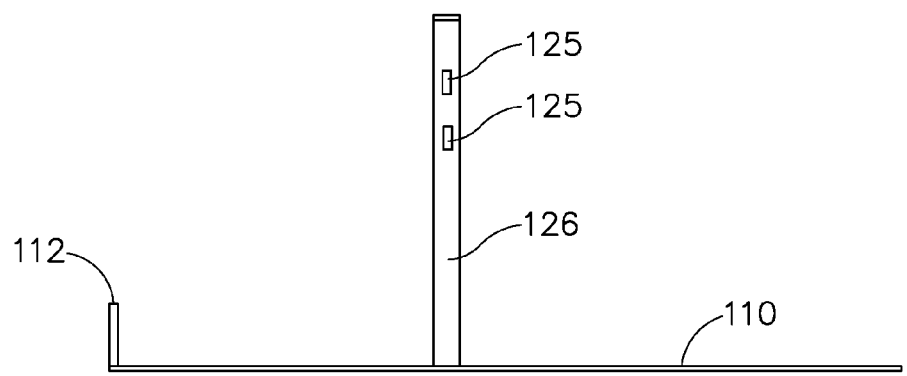
FIG. 30 is a side elevational view of the food portioning system of FIG. 28.
Figure 31:
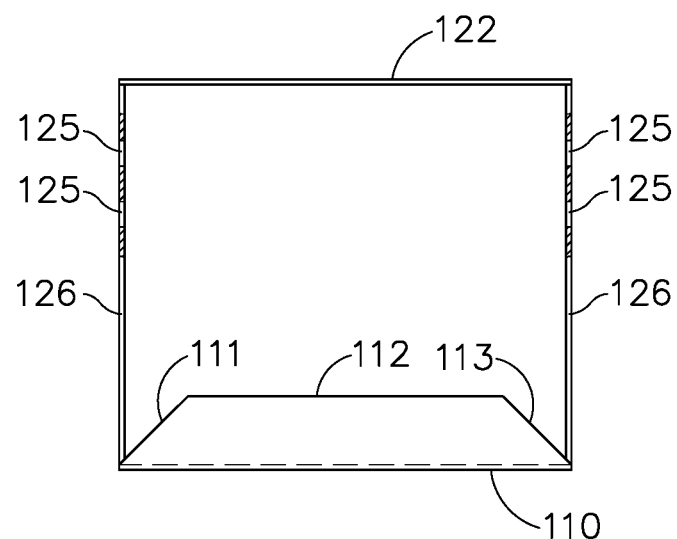
FIG. 31 is a front view of the food portioning system of FIG. 28.
Figure 32:
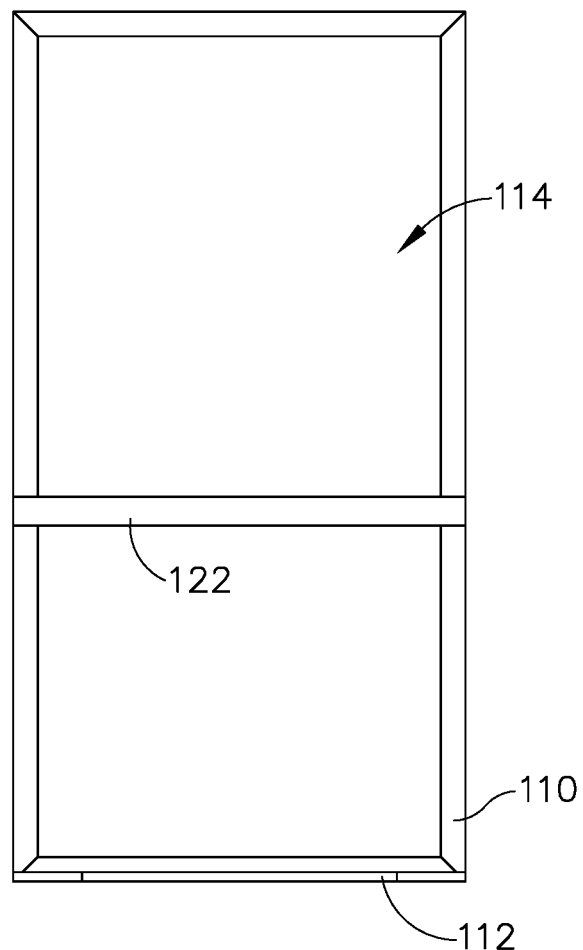
FIG. 32 is a top plan view of the food portioning system of FIG. 28.

Referring to FIGS. 29-31, support (110) further comprises a backstop (112) positioned at a rear portion of support (110). In the present embodiment, backstop (112) extends along substantially the entire width of support (110) and extends upwardly from support (110) such that backstop (112) is substantially perpendicular relative to support (110). For instance, backstop (112) can have a width of about 13½ inches and a height of about 1½ inches. Backstop (112) further comprises angled surfaces (111, 113) that extend inwardly relative to support (110). Backstop (112) is thereby configured to engage a rear edge of container (50) when container (50) is inserted within support (110) to prevent container (50) from sliding within support (110) during use. Backstop (112) can also be made of stainless steel or any food safe material.

It should be noted that backstop (112) is merely optional. Further, backstop (112) can include any other suitable size and/or shape (e.g., rectangular, square, triangular, etc.). Backstop (112) can extend along the entire width of support (110), or backstop (112) can extend along only a portion of the width of support (110). Backstop (112) can extend perpendicular relative to support (110), or backstop (112) can extend at any other suitable angle relative to support (110).

A bracket (120) is coupled with support (110) via fasteners to support a scrape bar (128) above support (110). Bracket (120) comprises a pair of rods (124, 126) extending upwardly from support (110). Each rod (124, 126) comprises at least one opening (123, 125) configured to receive scrape bar (128). In the illustrated embodiment, each rod (124, 126) comprises two openings (123, 125) positioned through a lateral axis of rods (124, 126) and oriented vertically relative to each other along a height of rods (124, 126). These openings (123, 125) allow scrape bar (128) to be inserted within a corresponding pair openings (123, 125) at different heights relative to support (110) such that the height of scrape bar (128) is adjustable. Each rod (124, 126) can have any suitable number of openings (123, 125). Alternatively, scrape bar (128) can be fixed to bracket (120) via fasteners, or scrape bar (128) can be integral with bracket (120). In the illustrated embodiment, each rod (124, 126) further comprises a rectangular cross-sectional profile. For instance, each rod can comprise about a ¼ inch by about ¾ inch stainless steel bar stock. Of course, other suitable sizes and/or shapes can be used for rods (124, 126). Bracket (120) further comprises a bar (122) extending between rods (124, 126). In the illustrated embodiment, bar (122) is positioned at a top portion of rods (124, 126) and is configured to maintain the spaced relationship between rods (124, 126). It should be noted that bar (122) is merely optional.

Figure 33:
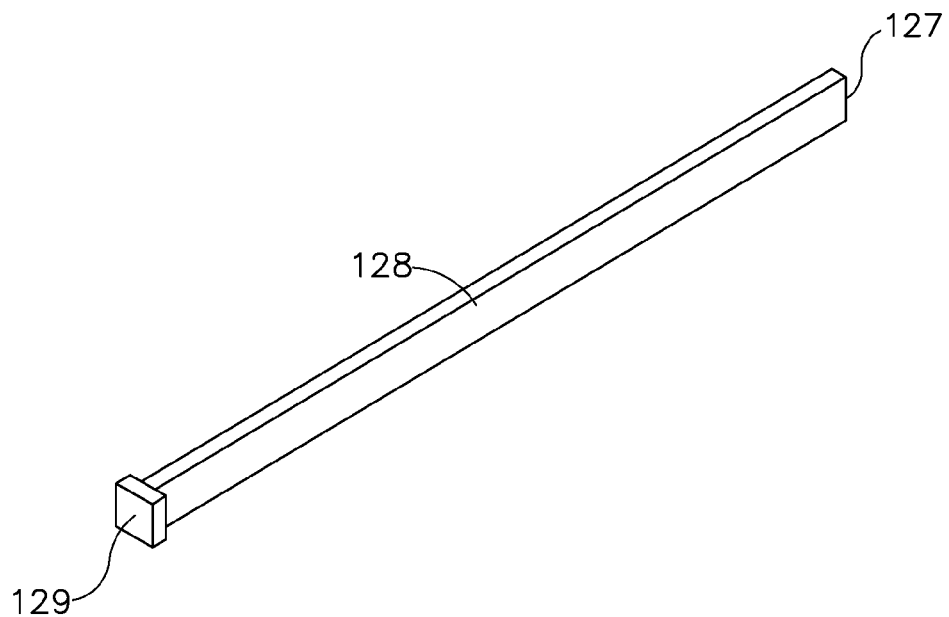
FIG. 33 is a top perspective view of a scrape bar of the food portioning system of FIG. 28.
Figure 34:
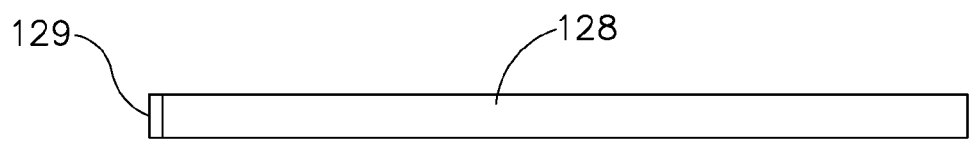
FIG. 34 is a side elevational view of the scrape bar of FIG. 33.
Figure 35:
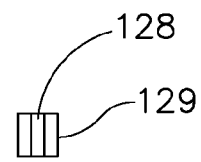
FIG. 35 is a rear view of the scrape bar of FIG. 33.

As best seen in FIGS. 33-35, scrape bar (128) is configured to extend along the width of support (110) between rods (124, 126) to position scrape bar (128) above opening (54) of container (50). In other embodiments, scrape bar (128) may extend across a portion of the width of support (110). Scrape bar (128) comprises a stopper (129) at one end of scrape bar (128). Stopper (129) extends outwardly from scrape bar (128) such that stopper (129) is larger than openings (123, 125) of rods (124, 126) to prevent scrape bar (128) from being inserted too far within bracket (120). Accordingly, a first end (127) of scrape bar (128) can be inserted through opening (125) of rod (126) and through the corresponding opening (123) of rod (124) until stopper (129) engages the outer surface of rod (126) to position scrape bar (128) substantially level between rods (124, 126). Scrape bar (128) can also be inverted such that scrape bar (128) can be inserted within bracket (120) in the other direction through opening (123) of rod (124) to opening (125) of rod (126). In some embodiments, a pin (not shown) can be inserted through the end (127) of scrape bar (128) after scrape bar (128) is inserted within bracket (120) to prevent scrape bar (128) from sliding out of bracket (120) during use. Alternatively, scrape bar (128) can be friction fit within openings (123, 125) of bracket (120) and/or scrape bar (128) can be coupled with bracket (120) via any other suitable type of fastener.

In the illustrated embodiment, scrape bar (128) comprises a rectangular cross-sectional profile, but any other suitable shape can be used (e.g., square, circular, etc.). Scrape bar (128) can be made from about a ¼ inch by about ¾ inch stainless steel stock bar and have a length of about 14¼ inches. Scrape bar (128) can be positioned centrally across support (110), or scrape bar (128) can be positioned off-center relative to support (110). For instance, in the illustrated embodiment, scrape bar (128) is positioned rearwardly relative to support (110) such that scrape bar (128) is about 8¾ inches from backstop (112). Of course, any other suitable material and/or dimensions can be used.

Figure 36:
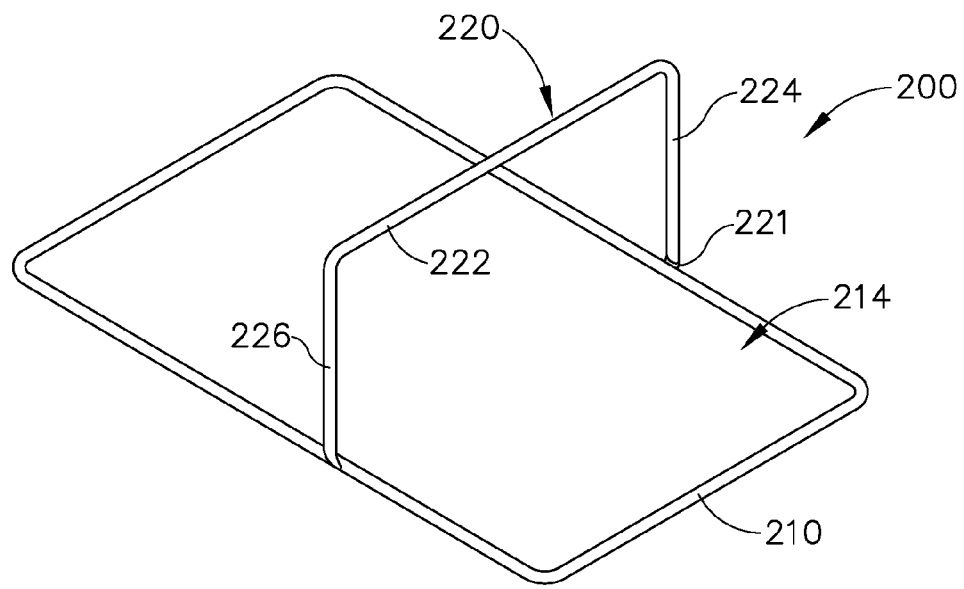
FIG. 36 is a top perspective view of another food portioning system.
Figure 37:
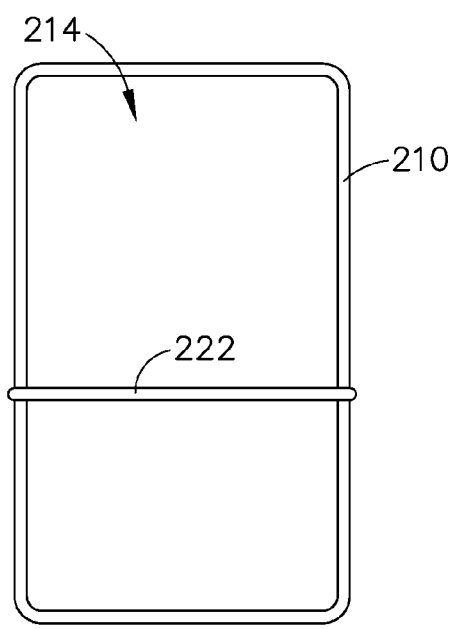
FIG. 37 is a top plan view of the food portioning system of FIG. 36.
Figure 38:
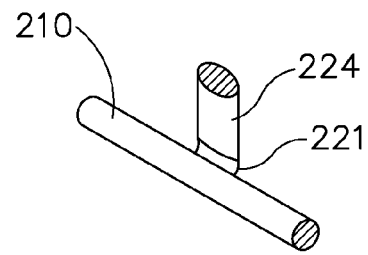
FIG. 38 is a top perspective view of a coupling of the food portioning system of FIG. 36.

FIGS. 36-38 show another embodiment of a food portioning system (200). Food portioning system (200) is similar to food portioning system (100), except that food portioning system (200) comprises a support (210) and bracket (220) having rounded edges instead of flat edges. For instance, in the illustrated embodiment, support (210) comprises rails having rounded edges formed into a rectangular shape. Support (210) is thereby formed to support a food container (50). For instance, rails of support (210) can comprise about a ½ inch diameter stainless steel rail to provide an opening (214) with a width of about 12 inches and a length of about 20 inches, to correspond to recess (54) of container. Accordingly, support (210) can have an outer width of about 13 inches and an outer length of about 21 inches. The rails of support (210) are thereby positioned to extend outwardly from opening (214) under container (50) to engage flange (52) of container (50) to support the weight of container (50).

Of course, other suitable dimensions and shapes can be used for container (50) and/or support (210). For instance, support (210) can have any suitable number of rails to form any suitable shape for opening (214) (e.g., rectangular, square, circular, etc.) to support a flange (52) of any suitable shaped container (50). Support (210) can have a similar shape as container (50), as discussed above, or support (210) can have a different shape than container (50). The rails can further have any suitable shaped cross-sectional profile (e.g., rectangular, square, circular, etc.). In the present embodiment, support (210) is configured to extend underneath flange (52) such that the outer edges of the rails of support (210) are substantially aligned with the outer edges of flange (52). In some other embodiments, support (210) can extend farther and/or shorter than the outer edges of flange (52). Support (210) can be made of any suitable food safe material.

A bracket (220) is coupled with support (210) to support a scrape bar (222) above support (210). Bracket (220) comprises a pair of rods (224, 226) extending upwardly from support (210). In the illustrated embodiment, scrape bar (222) extends between rods (224, 226) such that scrape bar (222) is fixed to bracket (120). In some embodiments, scrape bar (222) may be integral with bracket (220), or scrape bar (222) can be removable from bracket (220) such that scrape bar (222) can be adjustable at varying heights. Scrape bar (222) can extend between rods (224, 226) at any suitable height relative to support (210). Scrape bar (222) can extend across the entire width of support (210), or scrape bar (222) can extend across a portion of the width of support (210). As shown, each rod (224, 226) and scrape bar (222) further comprise a rounded cross-sectional profile. For instance, bracket (220) can comprise about a ½ inch diameter stainless steel rail. Of course, other suitable sizes and/or shapes can be used for bracket (220).

Bracket (220) is coupled to support (210) at coupling (221), as best seen in FIG. 38. Coupling (221) comprises a concave depression to allow flange (52) of container to fit within coupling (221). This may provide for a tighter fit between container (50) and food portioning system (200), but this is merely optional. Bracket (220) can be welded to support (210), or bracket (220) can be coupled to support (210) via other suitable fasteners. In some embodiments, bracket (220) and/or support (210) are integral, fixed and/or removably coupled relative to each other. In the illustrated embodiment, bracket (220) comprises a rounded cross-sectional profile, but any other suitable shape can be used (e.g., rectangular, square, circular, etc.). Bracket (220) can be made from about a ½ inch diameter stainless steel rail and have a height of about 7 inches. Of course, any other suitable material and/or dimensions can be used.

Figure 39:
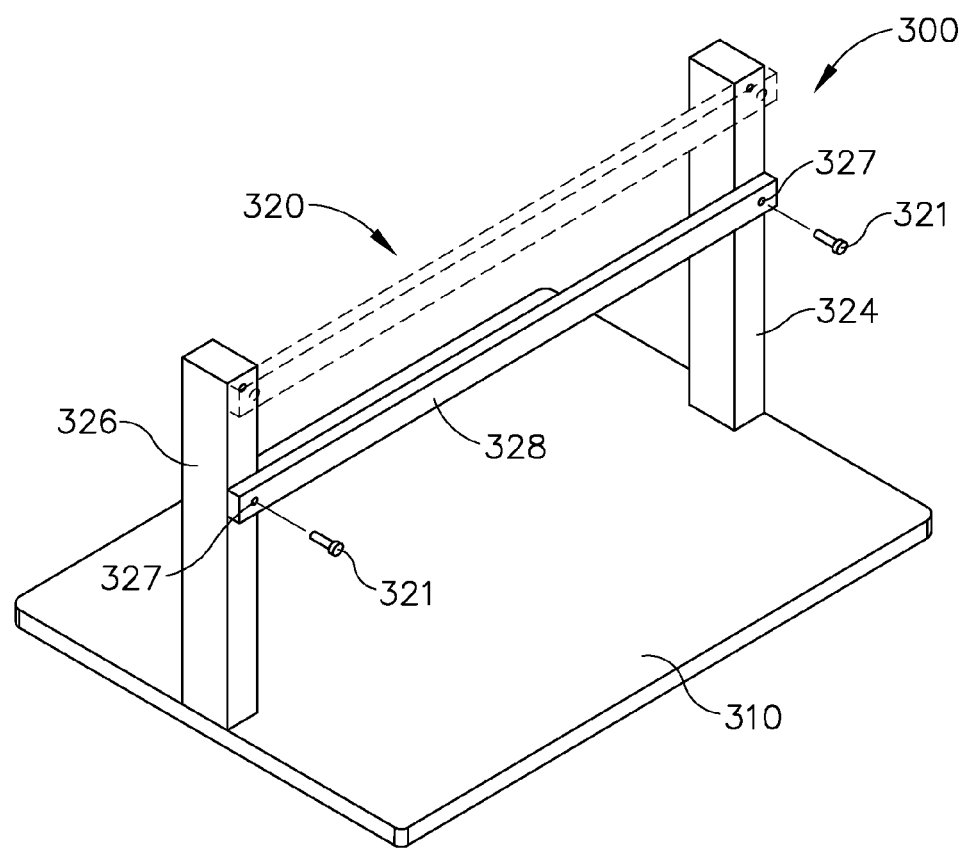
FIG. 39 is a top perspective view of another food portioning system.
Figure 40:
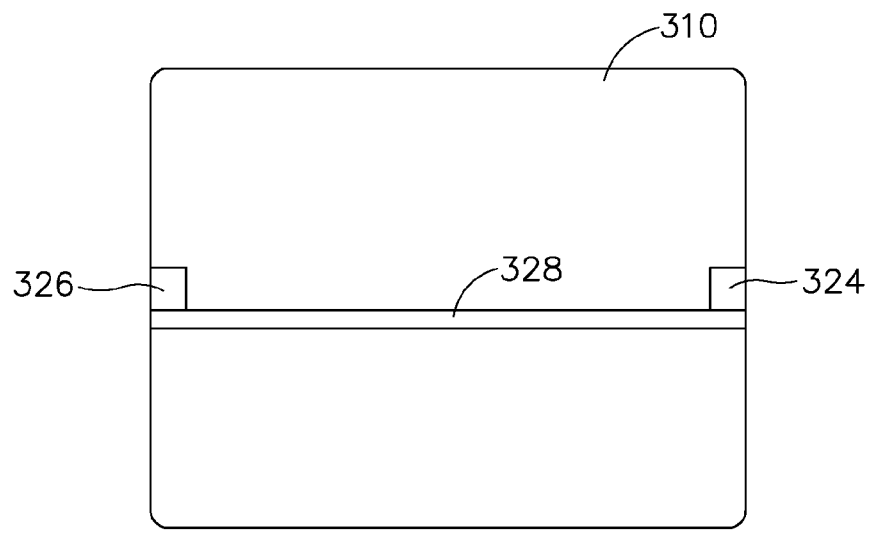
FIG. 40 is a top plan view of the food portioning system of FIG. 39.
Figure 41:
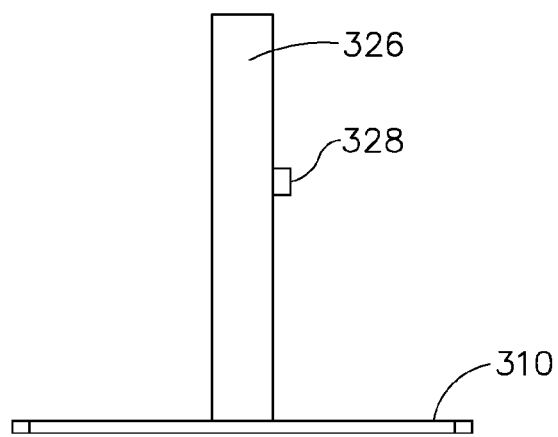
FIG. 41 is a side elevational view of the food portioning system of FIG. 39.

FIGS. 39-41 show another embodiment of a food portioning system (300). Food portioning system (300) is similar to food portioning system (100), except that food portioning system (300) comprises a board support (310) and instead of a railed support (110). For instance, in the illustrated embodiment, support (310) comprises a substantially flat board that can hold a container (50) on a top surface of the board.

As best seen in FIG. 39, food portioning system (300) comprises a support (310), a bracket (320), and a scrape bar (328). In the illustrated embodiment, support (310) comprises a rectangular board with rounded edges. Support (310) is thereby formed to support food containers (50) having various sizes and shapes on a top surface of support (310). For instance, support (310) can have a length of about 15 inches, a width of about 20 inches, and a thickness of about ½ inch. Support (310) can be made from any food safe material.

Of course, other suitable dimensions and shapes can be used for support (310). For instance, support (310) can be any suitable shape (e.g., rectangular, square, circular, etc.) and be any suitable size to support any suitable shaped container (50). Support (310) can have a similar shape as container (50), or support (310) can have a different shape than container (50). In the present embodiment, support (310) comprises rounded edges, but support (310) can also have flat edges.

A bracket (320) is coupled with support (310) via fasteners to support a scrape bar (328) above support (310). Bracket (320) comprises a pair of rods (324, 326) extending upwardly from support (310). Each rod (324, 326) comprises at least one opening (not shown) configured to receive a fastener (321) to couple scrape bar (328) with rods (324, 326). In the illustrated embodiment, each rod (324, 326) comprises two openings oriented vertically along a longitudinal axis of rods (324, 326). These openings allow scrape bar (328) to be inserted removably coupled with rods (324, 326) at different heights relative to support (310) such that the height of scrape bar (328) is adjustable. Each rod (324, 326) can have any suitable number of openings. Alternatively, scrape bar (328) can be fixed to bracket (320) via fasteners. In the illustrated embodiment, each rod (324, 326) further comprises a rectangular cross-sectional profile. For instance, each rod can have a height of about 11 inches, a width of about 1 inch, and a length of about 2 inches. Of course, other suitable sizes and/or shapes can be used for rods (324, 326).

Scrape bar (328) is configured to extend along the width of support (310) between rods (324, 326) to position scrape bar (328) above opening (54) of container (50). Scrape bar (328) comprises a bar having an opening (327) at each end to align with the openings of rods (324, 326). Accordingly, scrape bar (328) can be positioned against a front surface of rods (324, 326) to align openings (327) with a set of openings on rods (324, 326) to position scrape bar (328) substantially level between rods (324, 326). Scrape bar (328) can then be coupled to rods (324, 326) via fasteners (321). Scrape bar (328) can be moved up and/or down relative to rods (324, 326) to position scrape bar (328) with different openings on rods (324, 326) to adjust the height of scrape bar (328) relative to support (310).

In the illustrated embodiment, scrape bar (328) comprises a rectangular cross-sectional profile, but any other suitable shape can be used (e.g., square, circular, etc.). Scrape bar (328) can be made from about a ¼ inch by about ¾ inch stainless steel stock bar and have a length of about 20 inches. Scrape bar (328) can be positioned centrally across support (310), as shown in FIG. 39, or scrape bar (328) can be positioned off-center relative to support (310). Scrape bar (328) can extend across the entire width of support (310) or scrape bar (328) can extend across a portion of support (310). Of course, any other suitable material and/or dimensions can be used.

In some embodiments, a food portioning system comprises a support and a bracket extending upwardly from the support, wherein the support defines an opening, wherein the bracket comprises a scrape bar extending over the opening of the support. The support may comprise a plurality of rails. Each rail of the plurality of rails may comprise a cross-section having a downward angle. The downward angle of each rail may be about 15 degrees. The support may be removably coupled with a container such that the container is insertable within the opening of the support. The food portioning system may further comprise an insert selectively positioned on a top surface of the support. The insert may further comprise at least one cutout configured to receive a portion of the bracket. The support may further comprise a backstop configured to engage a container during use of the food portioning system. The scrape bar may be removably coupled with the bracket such that the height of the scrape bar may be adjustable relative to the support. The scrape bar may be removably coupled with the bracket via fasteners. The scrape bar may be removably coupled with the bracket by inserting the scrape bar into a pair of openings defined in the bracket. The bracket may comprise a concave coupling configured to couple the bracket with the support.

In some embodiments, a food portioning system comprises a support and a bracket extending upwardly from the support, wherein the support is removably coupled with a container such that the support is configured to hold the container, wherein the bracket comprises a scrape bar extending over the support. The support comprises at least one rail configured to engage a flange of the container. The support comprises a board having a top surface configured to receive a bottom surface of the container.

In some embodiments, a method of operating a food portioning system having a support and a scrape bar positioned over the support, the method comprising the steps of: selectively coupling a container with the support; scooping food from the container with a serving implement; and scraping the serving implement along the scrape bar to level the food portion within the serving implement. The method may further comprise lifting the container with the food portioning system, inserting container within a food well with the food portioning system, and/or setting the container on a board of the food portioning system.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. A food portioning system comprising:
    (a) a support comprising a plurality of rails defining an opening configured to receive a container; and
    (b) a bracket coupled with the support, wherein the bracket comprises a pair of rods extending upwardly from the support and a scrape bar positioned above the opening, wherein the pair of rods couple the scrape bar with the support, wherein the pair of rods are coupled with the support such that the position of the plurality of rails of the support are fixed relative to each other, wherein the scrape bar is configured to portion food within a serving implement;
        wherein the pair of rods comprises a first pair of openings aligned through a first lateral axis between the pair of rods and a second pair of openings aligned through a second lateral axis between the pair of rods, wherein the first lateral axis is positioned above the second lateral axis, and
        wherein the scrape bar is selectively insertable within the first pair of openings and the second pair of openings such that a height of the scrape bar is adjustable relative to the support.

2. The food portioning system of claim 1, wherein each rail of the plurality of rails comprises a cross-section having a downward angle.

3. The food portioning system of claim 1, wherein each rail of the plurality of rails comprises a top surface configured to support a flange of the container.

4. The food portioning system of claim 1, wherein the scrape bar is removably coupled with the bracket.

5. The food portioning system of claim 1, wherein the scrape bar is translatable relative to the bracket such that a height of the scrape bar is adjustable.

6. The food portioning system of claim 1, wherein the food portioning system comprises stainless steel.

7. The food portioning system of claim 1, wherein the support comprises a backstop configured to engage a container during use of the food portioning system.

8. A food portioning system comprising:
    (a) a support comprising a plurality of rails defining an opening configured to receive a container; and
    (b) a bracket coupled with the support, wherein the bracket comprises:
        (i) a pair of rods extending upwardly from the support, wherein the pair of rods comprises a first pair of openings aligned through a first lateral axis between the pair of rods and a second pair of openings aligned through a second lateral axis between the pair of rods, wherein the first lateral axis is positioned above the second lateral axis, and
        (ii) a scrape bar extending between the pair of rods such that the scrape bar is positioned above the opening, wherein the scrape bar is selectively insertable within the first pair of openings and the second pair of openings such that a height of the scrape bar is adjustable relative to the support.

* * * * *